(12) United States Patent
Zhou et al.

(10) Patent No.: US 12,500,727 B2
(45) Date of Patent: Dec. 16, 2025

(54) REPORTING OF PREFERRED SUBBAND CONFIGURATIONS FOR FULL DUPLEX OPERATIONS

(71) Applicant: QUALCOMM Incorporated, San Diego, CA (US)

(72) Inventors: Yan Zhou, San Diego, CA (US); Hemant Saggar, San Diego, CA (US); Qian Zhang, Basking Ridge, NJ (US); Tao Luo, San Diego, CA (US); Navid Abedini, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 510 days.

(21) Appl. No.: 18/052,515

(22) Filed: Nov. 3, 2022

(65) Prior Publication Data

US 2024/0154779 A1     May 9, 2024

(51) Int. Cl.
*H04L 5/14* (2006.01)
*H04W 72/23* (2023.01)

(52) U.S. Cl.
CPC .............. *H04L 5/14* (2013.01); *H04W 72/23* (2023.01)

(58) Field of Classification Search
CPC . H04W 72/23; H04W 72/12; H04W 72/1289; H04L 5/001; H04L 5/14
See application file for complete search history.

(56) References Cited

U.S. PATENT DOCUMENTS

| | | | |
|---|---|---|---|
| 2020/0374089 A1* | 11/2020 | Yang | H04L 5/0053 |
| 2022/0007395 A1 | 1/2022 | Lei et al. | |
| 2022/0052882 A1 | 2/2022 | Wang et al. | |
| 2022/0182160 A1* | 6/2022 | Su | H04B 17/309 |
| 2022/0272607 A1* | 8/2022 | Yu | H04W 8/20 |
| 2023/0067545 A1* | 3/2023 | Hattab | H04L 5/0048 |
| 2023/0254778 A1* | 8/2023 | Loffe | H04W 52/241 370/318 |
| 2023/0318798 A1* | 10/2023 | Su | H04W 72/54 370/329 |
| 2024/0107525 A1* | 3/2024 | Khan Beigi | H04L 5/1469 |
| 2024/0147445 A1* | 5/2024 | Gou | H04W 72/0446 |
| 2024/0155583 A1* | 5/2024 | Rudolf | H04L 5/0094 |
| 2024/0313931 A1* | 9/2024 | Lim | H04L 5/0064 |
| 2024/0341264 A1* | 10/2024 | Eby | A01H 6/542 |

OTHER PUBLICATIONS

International Search Report and Written Opinion—PCT/US2023/077018—ISA/EPO—Jan. 22, 2024.

* cited by examiner

Primary Examiner — Andrew Lee
(74) Attorney, Agent, or Firm — Holland & Hart LLP

(57) ABSTRACT

Methods, systems, and devices for wireless communications are described. A user equipment (UE) may transmit a subband full duplex (SBFD) pattern report, indicating a candidate SBFD pattern. The candidate SBFD pattern may indicate a candidate number of downlink or uplink subbands, a number of or location of guard bands, frequency locations of the uplink or downlink subbands or guard bands, a total uplink and downlink bandwidth, time locations of SBFD symbols or slots, transmit/receive beam pairs, transmission configuration indicator (TCI) state pairs or timing, or any combination thereof. The network may configure the UE with an SBFD pattern based on receiving the SBFD pattern report (e.g., which may or may not be the same as the reported candidate SBFD pattern).

30 Claims, 16 Drawing Sheets

REPORTING OF PREFERRED SUBBAND CONFIGURATIONS FOR FULL DUPLEX OPERATIONS

FIELD OF TECHNOLOGY

The following relates to wireless communications, including reporting of preferred subband configurations for full duplex operations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support reporting of preferred subband configurations for full duplex operations. For example, a user equipment (UE) may transmit a subband full duplex (SBFD) pattern report, which may include a candidate SBFD pattern (e.g., a preferred or requested number of downlink or uplink subbands, a number of or location of guard bands, frequency locations of the uplink or downlink subbands or guard bands, a total uplink and downlink bandwidth, time locations of SBFD symbols or slots, transmit/receive beam pairs, transmission configuration indicator (TCI) state pairs or timing, or any combination thereof).

The UE may transmit the SBFD pattern report via periodic, semi-persistent, or aperiodic resources or may autonomously request resources or transmit the report based on measured self-interference satisfying a threshold (e.g., which may be configured by the network). The UE may request the candidate SBFD pattern, but the network may determine whether to apply the candidate SBFD pattern, or the UE may automatically implement the pattern an amount of time after transmitting the report or receiving and acknowledgement from the network. In some examples, the UE may indicate, in the report, whether a candidate SBFD pattern is merely a request (e.g., optional), or if the candidate SBFD pattern is necessary.

A method for wireless communications is described. The method may include communicating, by a first wireless node, uplink and downlink signaling with a second wireless node according to a half duplex pattern or a full duplex pattern, transmitting, to the second wireless node, a subband full duplex pattern report including an indication of a candidate subband full duplex pattern including one or more first uplink subbands and one or more first downlink subbands, and communicating, based on transmitting the subband full duplex pattern report, simultaneous uplink and downlink signaling with the second wireless node according to a second subband full duplex pattern including one or more second uplink subbands and one or more second downlink subbands.

An apparatus for wireless communications is described. The apparatus may include a processor, memory coupled with the processor, and instructions stored in the memory. The instructions may be executable by the processor to cause the apparatus to communicate, by a first wireless node, uplink and downlink signal with a second wireless node according to a half duplex pattern or a full duplex pattern, transmit, to the second wireless node, a subband full duplex pattern report including an indication of a candidate subband full duplex pattern including one or more first uplink subbands and one or more first downlink subbands, and communicate, based at least in part on transmitting the subband full duplex pattern report, simultaneous uplink and downlink signaling with the second wireless node according to a second subband full duplex pattern including one or more second uplink subbands and one or more second downlink subbands.

Another apparatus for wireless communications is described. The apparatus may include means for communicating, by a first wireless node, uplink and downlink signaling with a second wireless node according to a half duplex pattern or a full duplex pattern, means for transmitting, to the second wireless node, a subband full duplex pattern report including an indication of a candidate subband full duplex pattern including one or more first uplink subbands and one or more first downlink subbands, and means for communicating, based on transmitting the subband full duplex pattern report, simultaneous uplink and downlink signaling with the second wireless node according to a second subband full duplex pattern including one or more second uplink subbands and one or more second downlink subbands.

A non-transitory computer-readable medium storing code for wireless communications is described. The code may include instructions executable by a processor to communicate, by a first wireless node, uplink and downlink signal with a second wireless node according to a half duplex pattern or a full duplex pattern, transmit, to the second wireless node, a subband full duplex pattern report including an indication of a candidate subband full duplex pattern including one or more first uplink subbands and one or more first downlink subbands, and communicate, based at least in part on transmitting the subband full duplex pattern report, simultaneous uplink and downlink signaling with the second wireless node according to a second subband full duplex pattern including one or more second uplink subbands and one or more second downlink subbands.

Some examples of the method, apparatuses, and non-transitory computer-readable medium described herein may further include operations, features, means, or instructions for receiving, from the second wireless node, a scheduling message indicating resources for transmitting the subband full duplex pattern report, where transmitting the subband full duplex pattern report may be based on receiving the scheduling message.

Some examples of the method, apparatuses, and non-transitory computer-readable medium described herein may further include operations, features, means, or instructions for transmitting a scheduling request for obtaining an uplink grant for transmitting the subband full duplex pattern report, where receiving the scheduling message may be based on transmitting the scheduling request.

In some examples of the method, apparatuses, and non-transitory computer-readable medium described herein, the indicated resources include periodic, semi-persistent, or aperiodic resources on layer 1 or layer.

Some examples of the method, apparatuses, and non-transitory computer-readable medium described herein may further include operations, features, means, or instructions for measuring self-interference at the first wireless node based on signaling communicated according to the half duplex pattern or the full duplex pattern, where transmitting the subband full duplex pattern report may be based on the measured self-interference satisfying a threshold.

Some examples of the method, apparatuses, and non-transitory computer-readable medium described herein may further include operations, features, means, or instructions for receiving, from the second wireless node, an indication of the threshold.

Some examples of the method, apparatuses, and non-transitory computer-readable medium described herein may further include operations, features, means, or instructions for including, in the subband full duplex pattern report, an indication of one or more candidate uplink subbands, one or more candidate downlink subbands, a candidate quantity of uplink subbands, a candidate quantity of downlink subbands, a candidate quantity of guard bands, a candidate total bandwidth, one or more candidate time locations of subband full duplex time intervals, a candidate transmit power at the first wireless node, a candidate transmit beam, a candidate receive beam, a threshold transmit power at the first wireless node, a candidate timing value for uplink or downlink transmission, one or more candidate transmission configuration indicator state pairs, a candidate bandwidth part, a candidate component carrier, or any combination thereof.

Some examples of the method, apparatuses, and non-transitory computer-readable medium described herein may further include operations, features, means, or instructions for including, in the subband full duplex pattern report, an indication of one or more uplink subbands that at least partially overlap in frequency with one or more downlink subbands.

Some examples of the method, apparatuses, and non-transitory computer-readable medium described herein may further include operations, features, means, or instructions for performing rate matching, channel state information reporting, spatial filtering, or any combination thereof, according to the second subband full duplex pattern.

Some examples of the method, apparatuses, and non-transitory computer-readable medium described herein may further include operations, features, means, or instructions for receiving, from the second wireless node based on transmitting the subband full duplex pattern report, a downlink message indicating the second subband full duplex pattern, where communicating according to the second subband full duplex pattern may be based on receiving the downlink message.

In some examples of the method, apparatuses, and non-transitory computer-readable medium described herein, the second subband full duplex pattern different than the candidate subband full duplex pattern.

Some examples of the method, apparatuses, and non-transitory computer-readable medium described herein may further include operations, features, means, or instructions for receiving, from the second wireless node based on transmitting the subband full duplex pattern report, an acknowledgement message, where the second subband full duplex pattern includes the candidate subband full duplex pattern, and where communicating according to the second subband full duplex pattern may be based on a timer associated with the acknowledgement message expiring.

Some examples of the method, apparatuses, and non-transitory computer-readable medium described herein may further include operations, features, means, or instructions for initiating, upon transmitting the subband full duplex pattern report, a timer, where communicating according to the second subband full duplex pattern may be based on the timer expiring.

Some examples of the method, apparatuses, and non-transitory computer-readable medium described herein may further include operations, features, means, or instructions for including, in the subband full duplex pattern report, an indication of whether use of the candidate subband full duplex pattern may be optional for the first wireless node or necessary for the first wireless node.

Some examples of the method, apparatuses, and non-transitory computer-readable medium described herein may further include operations, features, means, or instructions for monitoring for an acknowledgement message corresponding to the subband full duplex report and continuing to communicate uplink and downlink signaling with the second wireless node according to the second subband full duplex pattern based on a determination that the second wireless node may have not transmitted the acknowledgement message, where the second subband full duplex pattern may be the same as the full duplex pattern.

In some examples of the method, apparatuses, and non-transitory computer-readable medium described herein, the first wireless node includes a user equipment, a repeater, or a mobile terminal functionality of an integrated access backhaul node, a network entity, or any combination thereof, and the second wireless node includes a network entity, a distributed unit functionality of an integrated access backhaul node, a repeater, or any combination thereof.

A method for wireless communications is described. The method may include communicating uplink and downlink signaling with a first wireless node by a second wireless node according to a half duplex pattern or a full duplex pattern, receiving, from the first wireless node, a subband full duplex pattern report including an indication of a candidate subband full duplex pattern including one or more first uplink subbands and one or more first downlink subbands, and communicating, based on receiving the subband full duplex pattern report, simultaneous uplink and downlink signaling with the first wireless node according to a second subband full duplex pattern including one or more second uplink subbands and one or more second downlink subbands.

An apparatus for wireless communications is described. The apparatus may include a processor, memory coupled with the processor, and instructions stored in the memory. The instructions may be executable by the processor to cause the apparatus to communicate uplink and downlink signaling with a first wireless node by a second wireless node according to a half duplex pattern or a full duplex pattern, receive, from the first wireless node, a subband full duplex pattern report including an indication of a candidate subband full duplex pattern including one or more first uplink subbands and one or more first downlink subbands, and communicating, based at least in part on receiving the subband full duplex pattern report, simultaneous uplink and downlink signaling with the first wireless node according to a second subband full duplex pattern including one or more second uplink subbands and one or more second downlink subbands.

Another apparatus for wireless communications is described. The apparatus may include means for communicating uplink and downlink signaling with a first wireless node by a second wireless node according to a half duplex pattern or a full duplex pattern, means for receiving, from the first wireless node, a subband full duplex pattern report including an indication of a candidate subband full duplex pattern including one or more first uplink subbands and one or more first downlink subbands, and means for communicating, based on receiving the subband full duplex pattern report, simultaneous uplink and downlink signaling with the first wireless node according to a second subband full duplex pattern including one or more second uplink subbands and one or more second downlink subbands.

A non-transitory computer-readable medium storing code for wireless communications is described. The code may include instructions executable by a processor to communicate uplink and downlink signaling with a first wireless node by a second wireless node according to a half duplex pattern or a full duplex pattern, receive, from the first wireless node, a subband full duplex pattern report including an indication of a candidate subband full duplex pattern including one or more first uplink subbands and one or more first downlink subbands, and communicating, based at least in part on receiving the subband full duplex pattern report, simultaneous uplink and downlink signaling with the first wireless node according to a second subband full duplex pattern including one or more second uplink subbands and one or more second downlink subbands.

Some examples of the method, apparatuses, and non-transitory computer-readable medium described herein may further include operations, features, means, or instructions for transmitting, to the first wireless node, a scheduling message indicating resources for receiving the subband full duplex pattern report, where receiving the subband full duplex pattern report may be based on transmitting the scheduling message.

Some examples of the method, apparatuses, and non-transitory computer-readable medium described herein may further include operations, features, means, or instructions for receiving a scheduling request for obtaining an uplink grant for transmitting the subband full duplex pattern report, where transmitting the scheduling message may be based on receiving the scheduling request.

In some examples of the method, apparatuses, and non-transitory computer-readable medium described herein, the indicated resources include periodic, semi-persistent, or aperiodic resources.

Some examples of the method, apparatuses, and non-transitory computer-readable medium described herein may further include operations, features, means, or instructions for receiving the subband full duplex pattern report may be based on self-interference at the first wireless node satisfying a threshold.

Some examples of the method, apparatuses, and non-transitory computer-readable medium described herein may further include operations, features, means, or instructions for transmitting, to the first wireless node, an indication of the threshold.

Some examples of the method, apparatuses, and non-transitory computer-readable medium described herein may further include operations, features, means, or instructions for receiving, in the subband full duplex pattern report, an indication of one or more candidate uplink subbands, one or more candidate downlink subbands, a candidate quantity of uplink subbands, a candidate quantity of downlink subbands, a candidate quantity of guard bands, a candidate total bandwidth, one or more candidate time locations of subband full duplex time intervals, a candidate transmit power at the first wireless node, a candidate transmit beam, a candidate receive beam, a threshold transmit power at the first wireless node, a candidate timing value for uplink or downlink transmission, one or more candidate transmission configuration indicator state pairs, a candidate bandwidth part, a candidate component carrier, or any combination thereof.

Some examples of the method, apparatuses, and non-transitory computer-readable medium described herein may further include operations, features, means, or instructions for receiving, in the subband full duplex pattern report, an indication of one or more uplink subbands that at least partially overlap in frequency with one or more downlink subbands.

Some examples of the method, apparatuses, and non-transitory computer-readable medium described herein may further include operations, features, means, or instructions for transmitting, to the first wireless node based on receiving the subband full duplex pattern report, a downlink message indicating the second subband full duplex pattern, where communicating according to the second subband full duplex pattern may be based on transmitting the downlink message.

In some examples of the method, apparatuses, and non-transitory computer-readable medium described herein, the second subband full duplex pattern different than the candidate subband full duplex pattern.

Some examples of the method, apparatuses, and non-transitory computer-readable medium described herein may further include operations, features, means, or instructions for transmitting, to the first wireless node based on receiving the subband full duplex pattern report, an acknowledgement message, where the second subband full duplex pattern includes the candidate subband full duplex pattern, and where communicating according to the second subband full duplex pattern may be based on a timer associated with the acknowledgement message expiring.

Some examples of the method, apparatuses, and non-transitory computer-readable medium described herein may further include operations, features, means, or instructions for initiating, upon receiving the subband full duplex pattern report, a timer, where communicating according to the second subband full duplex pattern may be based on the timer expiring.

Some examples of the method, apparatuses, and non-transitory computer-readable medium described herein may further include operations, features, means, or instructions for receiving, in the subband full duplex pattern report, an indication of whether use of the candidate subband full duplex pattern may be optional for the first wireless node or necessary for the first wireless node.

Some examples of the method, apparatuses, and non-transitory computer-readable medium described herein may further include operations, features, means, or instructions for refraining from transmitting, to the first wireless node based on receiving the subband full duplex pattern report, an acknowledgement message corresponding to the subband full duplex report, where the second subband full duplex pattern may be the same as the full duplex pattern.

In some examples of the method, apparatuses, and non-transitory computer-readable medium described herein, the first wireless node includes a user equipment, a repeater, or a mobile terminal functionality of an integrated access backhaul node, a network entity, or any combination thereof, and the second wireless node includes a network entity, a distributed unit functionality of an integrated access backhaul node, a repeater, or any combination thereof.

DETAILED DESCRIPTION

Figure 1:
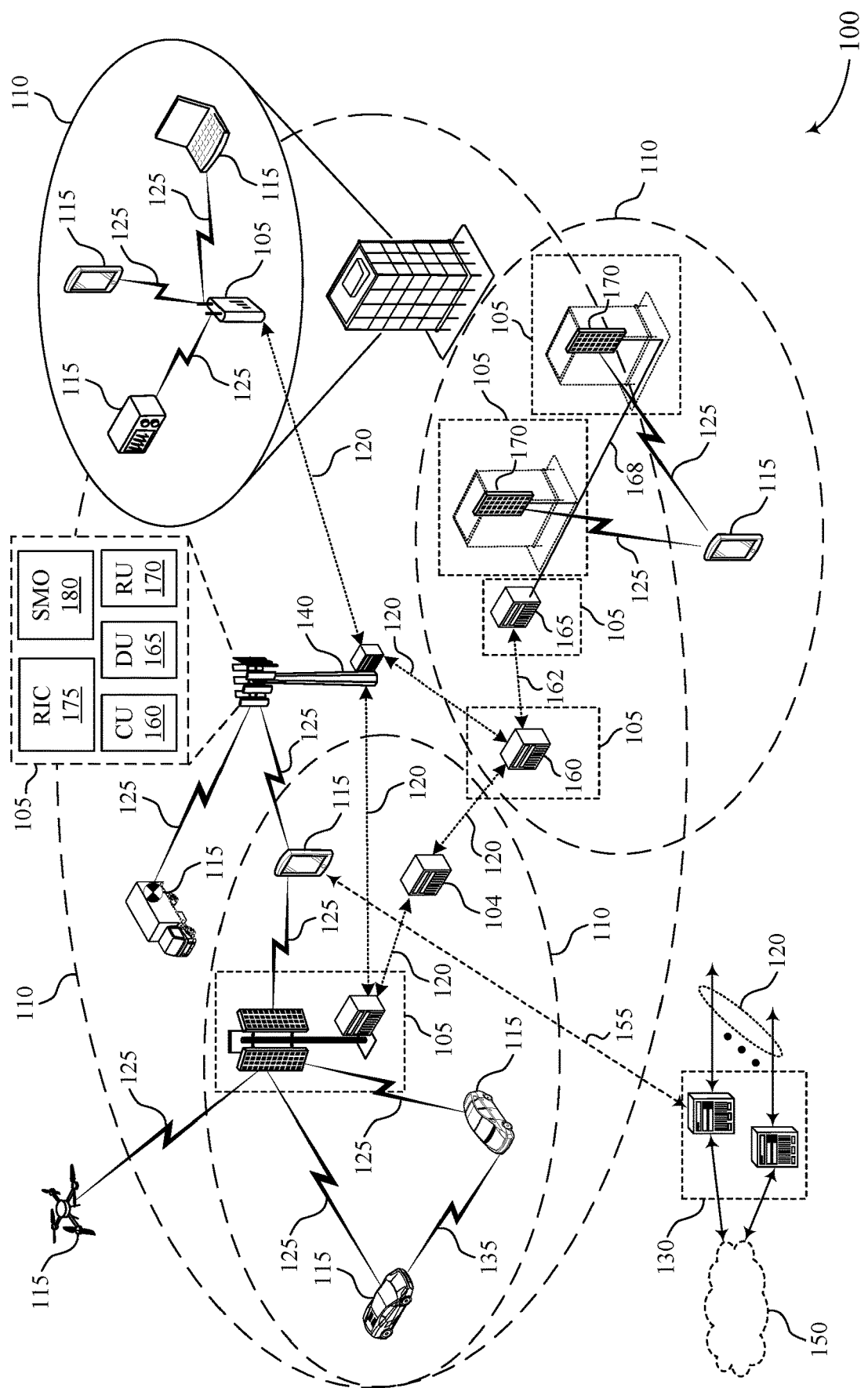
FIG. 1 illustrates an example of a wireless communications system that supports reporting of preferred subband configurations for full duplex operations in accordance with one or more aspects of the present disclosure.

A first wireless node (e.g., a UE) may communicate with a second wireless node (e.g., a network entity) according to various communication modes, such as a half duplex mode, a full duplex mode, a subband full duplex (SBFD) mode, or the like. When the UE is operating in a full duplex mode, such as an SBFD mode, the UE may simultaneously perform uplink and downlink communications on uplink subbands and downlink subbands (e.g., on a given component carrier (CC)). The UE may communicate according to a resource pattern (e.g., a full duplex pattern, a half duplex pattern, or an SBFD pattern). For instance, uplink subbands and downlink subbands (e.g., and in some cases, guard bands) may be configured according to an SBFD pattern (e.g., number and location of downlink subbands, uplink subbands, and guard bands within a CC). However, over time, one or more parameters may change (e.g., transmit power, obstructions, power amplifier non-linearities, beams, etc.). Such changes may result in increased self-interference (e.g., uplink communications via the uplink subband may result in self-interference detected by the UE via the downlink subband). Similarly, a UE operating in a half duplex mode, or a full duplex mode, may experience increased throughput and efficiency by subsequently communicating via a SBFD pattern.

To address (e.g., reduce or avoid, or otherwise mitigate) such self-interference, the UE may indicate, to the network entity, a candidate (e.g., preferred) communication pattern (e.g., a preferred SBFD pattern). The UE may transmit an SBFD pattern report, which may include a candidate SBFD pattern (e.g., a preferred or requested number of downlink or uplink subbands, a number of or location of guard bands, frequency locations of the uplink or downlink subbands or guard bands, a total uplink and downlink bandwidth, time locations of SBFD symbols or slots, transmit/receive beam pairs, transmission configuration indicator (TCI) state pairs or timing, or any combination thereof).

The UE may transmit the SBFD pattern report via periodic, semi-persistent, or aperiodic resources or may autonomously request resources or transmit the report based on measured self-interference satisfying a threshold (e.g., which may be configured by the network). The UE may request the candidate SBFD pattern, but the network may determine whether to apply the candidate SBFD pattern, or the UE may automatically implement the pattern an amount of time after transmitting the report or receiving and acknowledgement from the network. In some examples, the UE may indicate, in the report, whether a candidate SBFD pattern is merely a request (e.g., optional), or if the candidate SBFD pattern is necessary.

Aspects of the disclosure are initially described in the context of wireless communications systems. Aspects of the disclosure are further illustrated by and described with reference to wireless communications systems, SBFD pattern request schemes, and process flows. Aspects of the disclosure are further illustrated by and described with reference to apparatus diagrams, system diagrams, and flowcharts that relate to reporting of preferred subband configurations for full duplex operations.

FIG. 1 illustrates an example of a wireless communications system 100 that supports reporting of preferred subband configurations for full duplex operations in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125

(e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support reporting of preferred subband configurations for full duplex operations as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The UE 115 may indicate, to the network entity 105, a candidate (e.g., preferred) communication pattern (e.g., a preferred SBFD pattern). The UE 115 may transmit an SBFD pattern report, which may include a candidate SBFD pattern (e.g., a preferred or requested number of downlink or uplink subbands, a number of or location of guard bands, frequency locations of the uplink or downlink subbands or guard bands, a total uplink and downlink bandwidth, time locations of SBFD symbols or slots, transmit/receive beam pairs, transmission configuration indicator (TCI) state pairs or timing, or any combination thereof).

The UE 115 may transmit the SBFD pattern report via periodic, semi-persistent, or aperiodic resources or may autonomously request resources or transmit the report based on measured self-interference satisfying a threshold (e.g., which may be configured by the network). The UE 115 may request the candidate SBFD pattern, but the network may determine whether to apply the candidate SBFD pattern, or the UE 115 may automatically implement the pattern an amount of time after transmitting the report or receiving and acknowledgement from the network. In some examples, the UE 115 may indicate, in the report, whether a candidate SBFD pattern is merely a request (e.g., optional), or if the candidate SBFD pattern is necessary.

Figure 2:
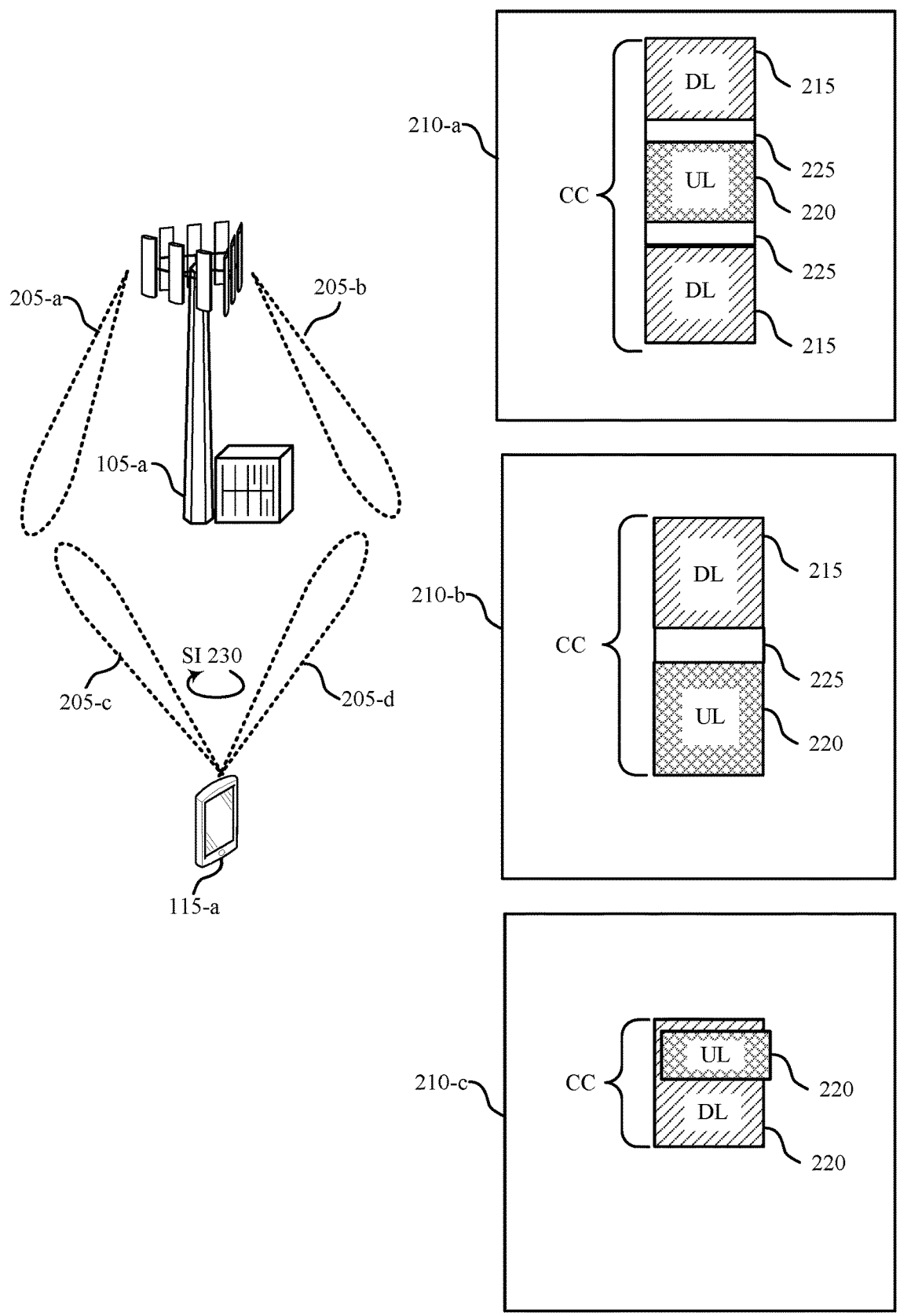
FIG. 2 illustrates an example of a wireless communications system that supports reporting of preferred subband configurations for full duplex operations in accordance with one or more aspects of the present disclosure.

FIG. 2 illustrates an example of a wireless communications system 200 that supports reporting of preferred subband configurations for full duplex operations in accordance with one or more aspects of the present disclosure. The wireless communications system 200 may implement, or be implemented by, aspects of the wireless communications system 100. For example, the wireless communications system 200 may include a network entity 105-*a*, and a UE 115-*a*, which may be examples of corresponding devices described with reference to FIG. 1. The UE 115-*a* may communicate with the network entity 105-*a* via one or more beams 205.

The UE 115-*a* and the network entity 105-*a* may communicate according to various communication modes. For example, the UE may communicate according to half duplex communications (e.g., uplink transmission or downlink transmissions in a given time interval, but not both), or full duplex communications (e.g., simultaneous uplink and downlink communications). In some examples, the network entity 105-*a*, the UE 115-*a*, or both, may support SBFD operations. For example, if the network entity 105-*a* supports SBFD operations, the network entity 105-*a* may simultaneously perform uplink communications (e.g., with a first UE 115) and downlink communications (e.g., with a second UE 115) on corresponding subbands (e.g., a downlink subband 215 and an uplink subband 220 within a same slot). If the UE 115-*a* supports SBFD operations, the UE 115-*a* may simultaneously perform uplink and downlink signaling with the network entity 105-*a* (e.g., or with multiple network entities 105, for example, in a multiple transmit receive point (m-TRP) deployment) using corresponding subbands.

A UE 115-*a* (e.g., or a network entity 105-*a*) that supports SBFD operations may communicate according to an SBFD pattern 210. SBFD patterns may include one or more downlink subbands 215 and one or more uplink subbands 220. In some examples, each SBFD pattern 210 may define a number of subbands (e.g., within a CC) for a given slot (e.g., an SBFD slot).

A first SBFD pattern 210-*a* may include one or more downlink subbands 215, one or more uplink subbands 220, and one or more guard bands 225. For example, SBFD pattern 210-*a* may include two downlink subbands 215 and one uplink subband 220 (e.g., which may be referred to as a D+U+D pattern), and SBFD pattern 210-*b* may include a downlink subband 215 and an uplink subband 220 (e.g., which may be referred to as a D+U pattern). Each guard band may be defined by a quantity of resource blocks (RBs) introduced between an uplink subband 220 and a downlink subband 215. In some examples, SBFD patterns may defined by one or more dynamic parameters. For example, a size (e.g., a frequency range, such as a number of RBs) of each subband, a location of each subband, a number of RBs for a guard band 225, a number of guard bands 225, or any combination thereof, may define a given SBFD pattern 210. Some SBFD patterns 210 may support overlapping subbands. For example, SBFD pattern 210-*c* may include an uplink subband 220 that partially (e.g., or completely) overlaps with a downlink subband 220 in frequency (e.g., and in time).

In some examples, SBFD operations may result in interference. For example, if the UE 115-*a* supports SBFD operations, the UE 115-*a* may transmit uplink signaling via an uplink subband 220 (e.g., via a transmit beam 205-*d*) while simultaneously receiving downlink signaling via a downlink subband 215 (e.g., via a receive beam 205-*c*). Such SBFD operations may result in self-interference (SI) 230 (e.g., while monitoring for downlink signaling, the UE 115-*a* may detect aspects of the uplink signaling the UE 115-*a* is performing during the same slot). SI 230 may depend on one or more factors (e.g., parameters), and may be time varying (e.g., may change over time). Such changes may occur due to variation of uplink power, resource location, transmit or receive beams 205, a change in reflectors, a change in timing, or any combination thereof. For example, the UE 115-*a* may perform uplink communication via a beam pair (e.g., beam 205-*b* and beam 205-*d*), and may perform downlink communication via a beam pair (e.g., beam 205-*c* and beam 205-*a*). However, as a user changes location, the beam pairs may also change, resulting in a change in SI 230. Similarly, a change in use case (e.g., hand position) at the user, or a change in reflectors (e.g., a beam pair may rely on a certain reflector, or relay device, such as a reflective intelligent surface (RIS)), may result in a change (e.g., an increase) in SI 230.

Communications conditions may change over time. For example, the UE 115-*a* may communicate according to a half duplex mode, but may request an SBFD pattern 210 (e.g., for more efficient communications and improved throughput and decreased latency). In some examples, the UE may communication initially with the network entity 105-*a* using a first SBFD pattern 210 (e.g., the network entity 105-*a* may configure the UE 115-*a* with an initial SBFD pattern 210). However, over time, as one or more parameters change, the configured SBFD pattern 210 may result in SI 230 at the UE 115-*a* (e.g., despite the SBFD pattern 210 previously being effective for the UE 115-*a*). Techniques described herein support adaptation of the communication patterns over time. For instance, the UE 115-*a* may switch from a half duplex pattern or a full duplex pattern to an SBFD pattern 210, or from a first SBFD pattern 210 to a second SBFD pattern 210 based on one or more parameter values that may change over time. For instance, examples of such changing parameter values (e.g., which may affect a choice of subband pattern 220) may include an SI status at the UE 115-*a*, a transmit power for one or more uplink subbands 220, a power amplifier (PA) non-linearity, an adjacent channel leakage ratio (ACLR) at the UE 115-*a*, a low noise amplifier (LNA) non-linearity, downlink uplink resource frequency locations, a spatial isolation (e.g., of beams or panels, which may be beam or panel dependent), whether digital interference cancellation is used, a wireless channel between the UE 115-*a* and the network entity 105-*a*, an inter-carrier interference (ICI) due to misaligned receiver/transmitter timing and phase noise, or any combination thereof. As described herein, if any such parameters change, satisfy a threshold, are measured to satisfy or exceed a ratio or a value, or if the UE 115-*a* detects SI 230 (e.g., or to achieve a specific configuration of any of the listed parameters), the UE 115-*a* may initiate configuration of an updated SBFD pattern 210 (e.g., or request a first SBFD pattern 210).

Figure 3:
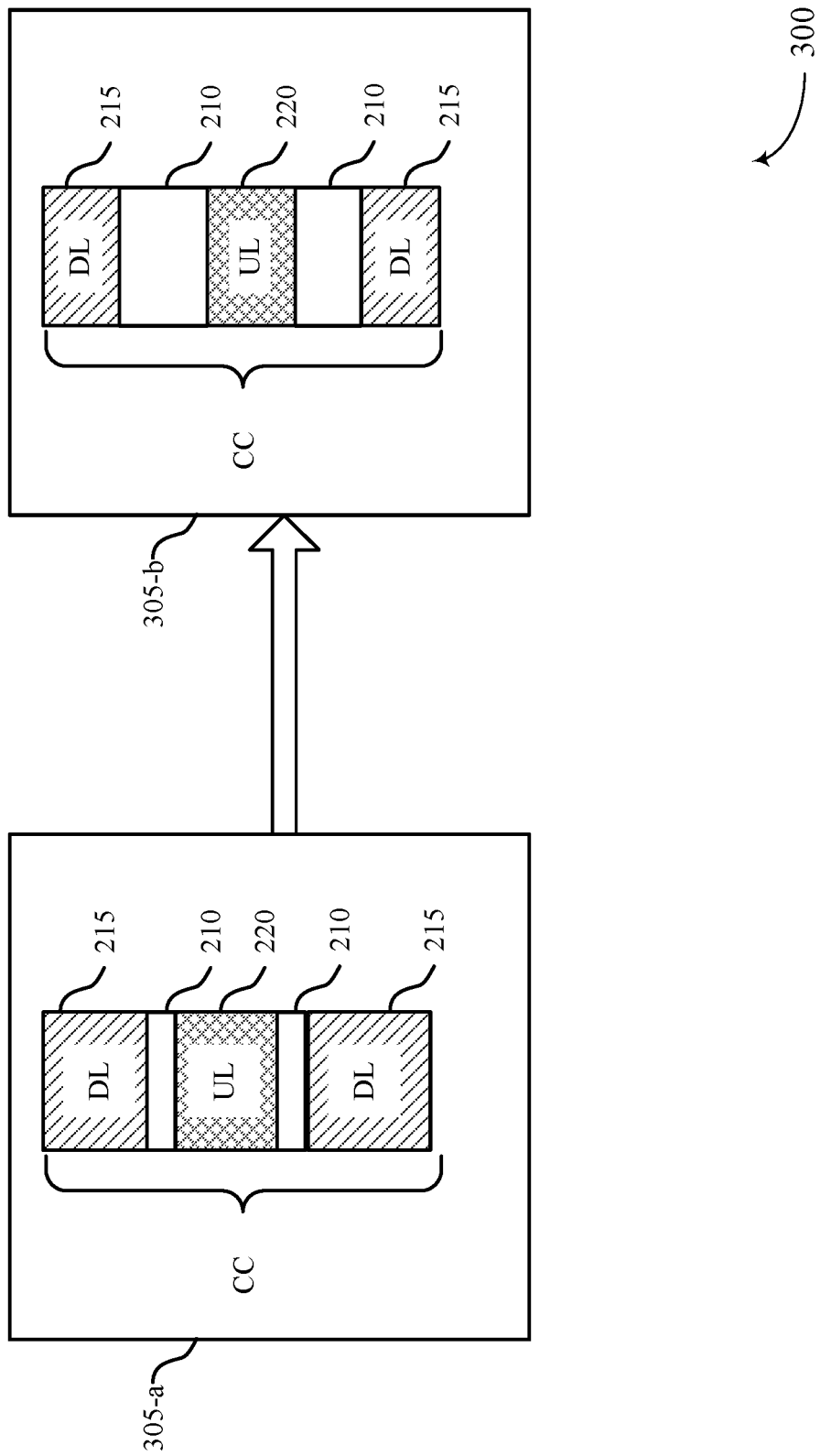
FIG. 3 illustrates an example of a subband full duplex (SBFD) pattern request scheme that supports reporting of preferred subband configurations for full duplex operations in accordance with one or more aspects of the present disclosure.

FIG. 3 illustrates an example of an SBFD pattern request scheme 300 that supports reporting of preferred subband configurations for full duplex operations in accordance with one or more aspects of the present disclosure. The SBFD pattern request scheme 300 may be implemented by, or may implement aspects of, the wireless communications system 100 and the wireless communications system 200. For example, a UE (e.g., a UE 115-*a*) and a network entity (e.g., a network entity 105-*a*), which may be examples of corresponding devices described with reference to FIGS. 1-2, may communicate according to the SBFD pattern request scheme 300.

A UE operate according to a first SBFD pattern 305 (e.g., the SBFD pattern 305-*a*). However, over time, the UE may experience an increase in SI while performing SBFD operations according to the SBFD pattern 305-*a*. The UE may indicate, to the network entity, an updated or preferred SBFD pattern 305 (e.g., may indicate a preferred SBFD pattern 305-*b*). For instance, as time passes, the guard bands 225 of the SBFD pattern 305-*a* may no longer be sufficient to address (e.g., avoid or mitigate) SI. The UE may indicate a preferred SBFD pattern 305-*b*, which includes larger guard bands 225. In such examples, the network entity may transmit an indication of an updated SBFD pattern 305 (e.g., the SBFD pattern 305-*b*), and the UE may avoid SI by communicating with the network entity according to the SBFD pattern 305-*b*. Although illustrated with reference to the SBFD pattern 305-*a* and the SBFD pattern 305-*b*, techniques described herein may apply to any communication patterns. For instance, a UE operating according to a half duplex mode or another full duplex mode may transmit an SBFD pattern report indicating a candidate SBFD pattern 305. In some examples, the UE operating according to a first SBFD pattern 305 (e.g., with a first number of uplink subbands 220 and downlink subbands 215, or with downlink subbands 215 that do not overlap with uplink subbands 220) may transmit an SBFD pattern report indicating a second SBFD pattern 305 (e.g., with a second number of uplink subbands 220 and downlink subbands 215, or with downlink subbands 215 that overlap with uplink subbands 220). A UE operating according to any SBFD pattern 305 (e.g., any SBFD pattern 205) may report any candidate SBFD pattern 305.

As described herein, the UE may indicate, to the network entity, a candidate SBFD pattern 305 (e.g., a preferred or requested SBFD pattern information). Such a request may indicate pattern information for the candidate SBFD pattern, such as a number of downlink subbands 315 or uplink subbands 320, a number or size of guard bands 310, frequency resource lotions for downlink subband 315, uplink subband 320, or guard bands 310, a total downlink bandwidth, uplink bandwidth, or a total downlink/uplink bandwidth for the SBFD pattern 305, time locations of SBFD symbols or slots, intended transmit and receive beam pairs, downlink or uplink transmission configuration indicator (TCI) states or TCI state pairs, intended frequency resources (e.g., intended CCs, intended bandwidth part (BWP), etc.), per candidate SBFD pattern.

SBFD pattern usage may enhance rate matching, CSI reporting, filter adaptations in UE SBFD procedures, or the like. In some examples, upon being configured with an updated SBFD pattern 305, the UE may also update its rate matching (e.g., for transmissions via the subbands of the updated SBFD pattern 305), CSI reporting (e.g., may report CSI for subbands that are difference sizes and cover different frequency ranges based on the updated SBFD pattern 305), may perform filter adaptations (e.g., tune an internal filter bandwidth for better self-interference rejection based on the updated SBFD pattern 305) for the updated SBFD pattern 305, or any combination thereof. In some examples, the network entity may configure the UE with updated parameters for the updated SBFD pattern (e.g., to facilitate the updated rate matching, CSI reporting, filtering, etc.). Such updated parameters may be provided to the UE via the same signaling that configures the updated SBFD pattern 305, or via one or more separate messages.

In some examples, the UE may request an SBFD pattern that includes fully or partially overlapping downlink subbands 215 and uplink subbands 220. The UE may request the updated SBFD pattern based on SI measurements at the UE. In some examples, subband isolation may not be needed by the UE if spatial isolation is sufficient (e.g., the UE may request an SBFD pattern 305 with overlapping downlink subbands 215 and uplink subbands 220 if spatial diversity is sufficient or if SI or channel measurements satisfies a threshold).

The UE may transmit an SBFD pattern report indicating a preferred SBFD pattern 305 (e.g., a feedback message indicating the requested SBFD pattern 305) via resources scheduled by the network entity. For example, the network may configure the UE with periodic, semi-persistent, or aperiodic resources (an L1 or L3 report). The UE may then transmit the SBFD pattern report via the periodic, semi-persistent, or aperiodic resources (e.g., in case of semi-persistent resources, the network may activate or deactivate the semi-persistent resources). In some examples, the UE may initiate the transmission of the SBFD pattern report (e.g., via an event triggered report on a physical uplink control channel (PUCCH) or media access control (MAC) control element (CE). In some examples, the UE may transmit a scheduling request, and the network may schedule resources on which the UE will transmit the SBFD pattern report.

In some examples of an event triggered report, the UE may transmit the SBFD pattern report if one or more conditions are satisfied (e.g., if a triggering condition is satisfied). For instance, if a total measured SI at the UE (e.g., on a downlink subband 315, multiple downlink subbands 315, a subset of a downlink subband such as a subset of downlink tones or RBs) satisfies a threshold, then the UE may transmit the SBFD pattern report (e.g., may transmit a scheduling request to be granted resources for transmitting the SBFD pattern). For example, if the SI exceeds a threshold $$\left(e.g., \text{ if } \frac{SI + \text{noise}}{\text{noise}} > \text{threshold, or if } \frac{DL \text{ signal}}{SI + \text{noise}} < \text{threshold}\right),$$

then the UE may transmit the SBFD pattern report. The threshold may be defined in one or more standards documents, or the network entity may indicate the threshold to the UE (e.g., via higher layer signaling). The UE may measure the SI during dedicated resources (e.g., configured by the network as a subset of resources). In some examples, the UE may measure the SI autonomously based on uplink traffic. Different SBFD patterns 305 may include different subsets of configured resources for SI measurement.

In some examples, the SBFD pattern report may include a set of parameters associated with a preferred SBFD pattern (e.g., a number of downlink subbands 315, a number of uplink subbands 320, a number of guard bands 310, frequency location per downlink subband 315, uplink subbands 320, or guard bands 310, a total downlink and uplink bandwidth, a time location of SBFD symbols or slots, an intended beam pair, a downlink TCI state, uplink TCI state, or downlink or uplink TCI state pairs, intended BWPs or CCs per preferred SBFD pattern). In some examples, All or a subset of such parameters may be reported via corresponding values. In some examples, the network may configure the UE with a set of indices associated with different parameters (e.g., one lookup table (LUT) for each parameter type) and the UE may transmit, in the SBFD pattern report, a set of indices for the various LUTs. IN some examples the network may configure the UE with a set of indices associated with a set of defined SBFD patterns (e.g., a LUT where each index corresponds to an SBFD pattern 305). In some examples, the UE may transmit raw measurements (e.g., SI, transmit power, CSI, etc.) to the network, and the network may determine an updated SBFD pattern for the UE based on the raw measurements.

In some examples, the network entity may determine whether to apply the requested SBFD pattern 305. For example, the network entity may receive the SBFD pattern request, and may determine whether to implement the requested SBFD pattern 305.

In some examples, the UE may determine whether to implement a requested SBFD pattern. For example, the UE may apply the requested SBFD pattern a threshold amount of time (e.g., upon expiration of a timer) after transmitting the SBFD pattern report, or a threshold amount of time (e.g., upon expiration of a timer) after receiving an acknowledgement message corresponding to the SBFD pattern report. In some examples, the UE may indicate, in the SBFD pattern report, whether the reported pattern is a recommendation, or must be applied (e.g., whether the reported SBFD pattern 305 is optional or mandatory). In such examples, the network may consider the indication of whether the reported pattern is a recommendation.

In some examples, the UE may include (e.g., jointly with or included in the SBFD pattern report), one or more operation parameters (e.g., to meet the SI requirement). The additional parameters may include, for example, a threshold (e.g., maximum) transmit power in one or more uplink subbands 220 (e.g., an indication of a power backoff or available power headroom) corresponding downlink or uplink beams or TCI states, a candidate (e.g., preferred or requested) downlink transmit power adjustment, a candidate (e.g., preferred or requested) downlink or uplink transmission timing adjustment, or any combination thereof.

Figure 4:
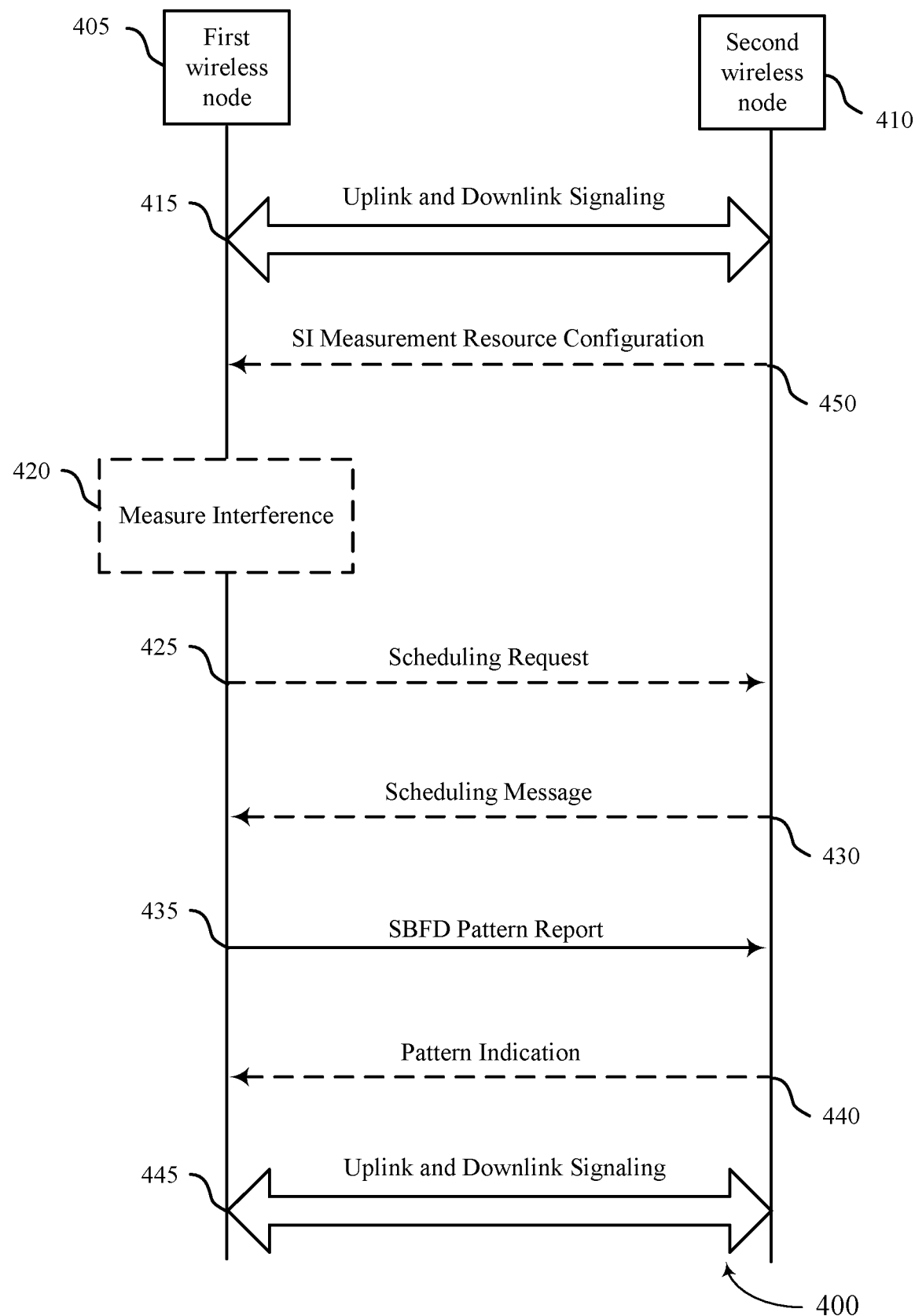
FIG. 4 illustrates an example of a process flow that supports reporting of preferred subband configurations for full duplex operations in accordance with one or more aspects of the present disclosure.

FIG. 4 illustrates an example of a process flow 400 that supports reporting of preferred subband configurations for full duplex operations in accordance with one or more aspects of the present disclosure. The process flow 400 may include a first wireless node 405 and a second wireless node 410. The first wireless node may be a UE (e.g., the UE 115-a), a repeater, an MT functionality of an IAB node, a network entity 105, or any combination thereof. The second wireless node may be a network entity (e.g., a network entity 105-a), a DU functionality of an IAB node, a repeater, or any combination thereof. The process flow 400 may implement aspects of, or be implemented by aspects of, the wireless communications system 100, the wireless communications system 200, or the SBFD pattern request scheme 300. For example, the first wireless node 410 and the second wireless node may be examples of corresponding devices (e.g., UEs 115, network entities 105) described with reference to FIGS. 1-3.

At 415, the first wireless node 405 may communicate uplink and downlink signaling with the second wireless node 410 according to a half duplex pattern or a full duplex pattern (e.g., an initial SBFD pattern).

At 435, the first wireless node 405 may transmit an SBFD pattern report to the second wireless node 410. The SBFD pattern report may include an indication of a candidate SBFD pattern including one or more first uplink subbands and one or more first downlink subbands.

The SBFD pattern report may include an indication of one or more candidate uplink subbands, one or more candidate downlink subbands, a candidate quantity of uplink subbands, a candidate quantity of downlink subbands, a candidate quantity of guard bands, a candidate total bandwidth, one or more candidate time locations of SBFD time intervals, a candidate transmit power at the first wireless node, a candidate transmit beam, a candidate receive beam, a threshold transmit power at the first wireless node, a candidate timing value for uplink or downlink transmission, one or more candidate transmission configuration indicator state pairs, a candidate bandwidth part, a candidate component carrier, or any combination thereof. The SBFD pattern report may include an indication of one or more uplink subbands that at least partially overlap in frequency with one or more downlink subbands.

At 445, the first wireless node 405 may communicate with the second wireless node 410 based on having transmitted the SBFD pattern report at 435. The communicating may include simultaneous uplink and downlink signaling to a second SBFD pattern including one or more second uplink subbands and one or more second downlink subbands. In some cases, the first wireless node 405 may perform rate matching, CSI reporting, spatial filtering, or any combination thereof, according to the second SBFD pattern.

In some examples, the first wireless node 405 may transmit the SBFD pattern report via reserved resources. For example, at 430, the first wireless node 405 may transmit a scheduling message indicating resources for transmitting the SBFD pattern report. The indicated resources may be periodic or semi-persistent, or aperiodic, and may be conveyed via layer 1 or layer 3 signaling. In some examples, the first wireless node 405 may transmit, at 425, a scheduling request for obtaining the uplink grant for transmitting the SBFD pattern report, and the first wireless node 405 may receive the scheduling message at 430 based thereon.

In some cases, the first wireless node 405 may request the candidate SBFD pattern based on measured interference. For example, at 420, the first wireless node 405 may measure interference. The first wireless node 405 may measure interference in half duplex mode (e.g., may measure a reference signal receive power) on a downlink beam while transmitting in a half duplex mode. Half duplex interference measurements may be performed during ongoing traffic based on configured sounding reference signal (SRS) resources. Similarly, the first wireless node 405 may measure interference (e.g., SI) in a full duplex mode or SBFD mode by measuring SI (e.g., during specified or allocated resources). If the measured interference satisfies (e.g., exceeds) a threshold value, then the first wireless node 405 may transmit the SBFD pattern report indicating the candidate SBFD pattern (e.g., or may transmit the scheduling request at 425). The first wireless node 405 may measure interference on downlink subbands, or a subset of downlink tones. Where such measurements are performed may be indicated in the SBFD report, or may be pre-configured by the network (e.g., the second wireless node 410). For instance, at 450, the second wireless node 410 may configure the first wireless node 405 with resource on which to measure SI at 420 (e.g., may transmit an SI measurement resource configuration message to the first wireless node 405).

At 440, the first wireless node 405 may receive a pattern indication from the second wireless node 410. For example, the first wireless node 405 may receive a downlink message indicating the second SBFD pattern. The second SBFD pattern may be different than the candidate SBFD requested in the SBFD pattern report. The second SBFD pattern may be the same as the candidate SBFD pattern requested in the SBFD pattern report. In some examples, at 440, the first wireless node 405 may receive the pattern indication in the form of an acknowledgment (ACK) message corresponding to the SBFD pattern report. The first wireless node 405 may implement the candidate SBFD pattern at 445 based on receiving the ACK (e.g., or any message confirming the candidate SBFD pattern). In some examples, the first wireless node 405 may implement the candidate SBFD pattern (e.g., autonomously) a fixed time (e.g., upon expiration of a timer) after transmitting the SBFD pattern report at 435, or a fixed time (e.g., upon expiration of a timer) after receiving the ACK message at 440. In some examples, the first wireless node 405 may indicate, in the SBFD pattern report, whether the candidate SBFD pattern is optional or necessary.

The second wireless node 410 may then determine whether to implement the candidate SBFD pattern (e.g., and may indicate the determination at 440) based on the indication (e.g., of whether the candidate SBFD pattern is necessary or optional).

In some examples, the first wireless node 405 may monitor for the pattern indication (e.g., an ACK message) at 440. In absence of reception of such an ACK message the first wireless node 405 may refrain from changing a current communication mode (e.g., a half duplex mode or full duplex mode or previous SBFD pattern) at 445.

Figure 5:
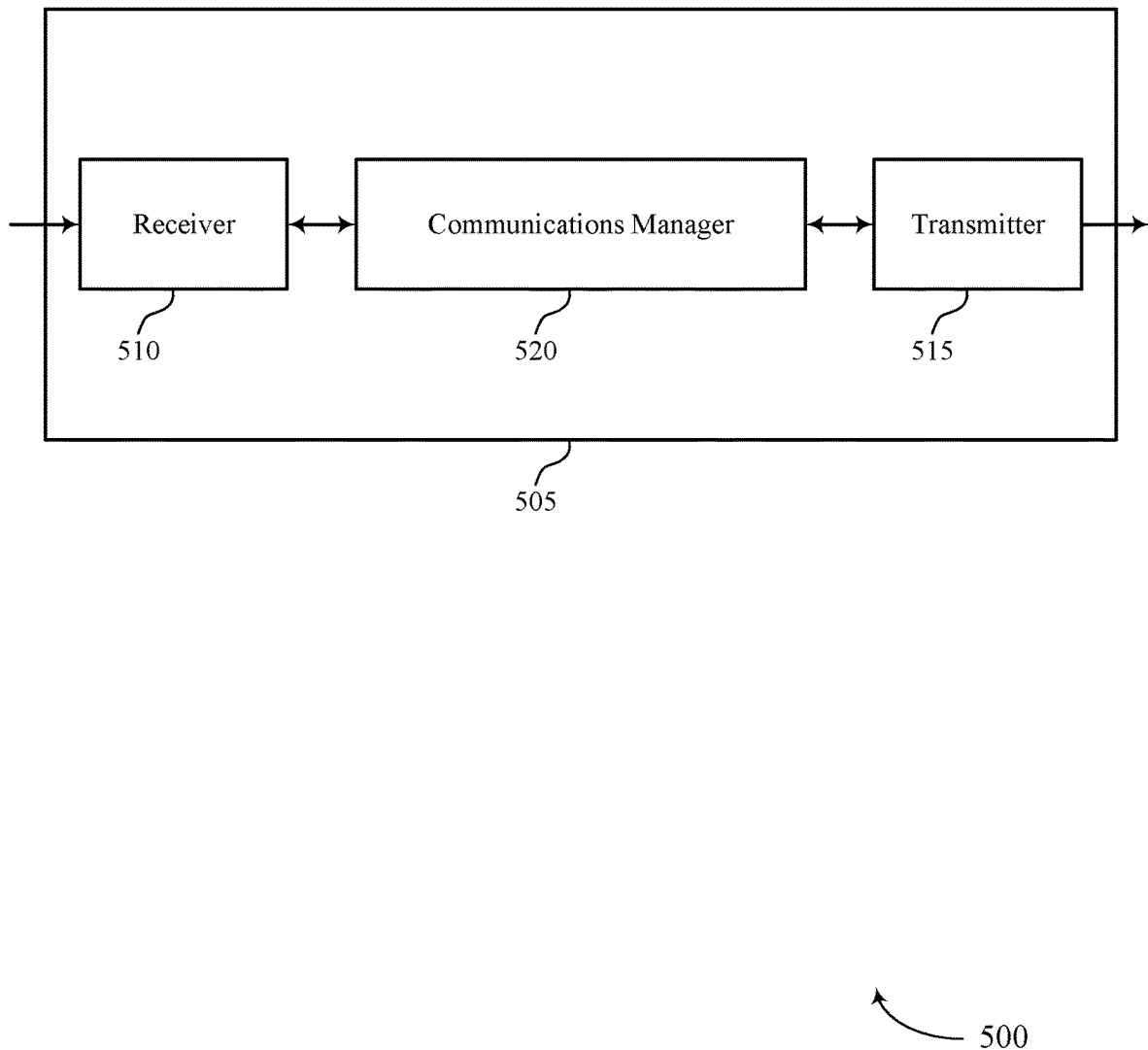
FIGS. 5 and 6 illustrate block diagrams of devices that support reporting of preferred subband configurations for full duplex operations in accordance with one or more aspects of the present disclosure.

FIG. 5 illustrates a block diagram 500 of a device 505 that supports reporting of preferred subband configurations for full duplex operations in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to reporting of preferred subband configurations for full duplex operations). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to reporting of preferred subband configurations for full duplex operations). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of reporting of preferred subband configurations for full duplex operations as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 may be configured as or otherwise support a means for communicating, by a first wireless node, uplink and downlink signaling with a second wireless node according to a half duplex pattern or a full duplex pattern. The communications manager 520 may be configured as or otherwise support a means for transmitting, to the second wireless node, a SBFD pattern report including an indication of a candidate SBFD pattern including one or more first uplink subbands and one or more first downlink subbands. The communications manager 520 may be configured as or otherwise support a means for communicating, basing at least in part on transmitting the SBFD pattern report, simultaneous uplink and downlink signaling with the second wireless node according to a second SBFD pattern including one or more second uplink subbands and one or more second downlink subbands.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for full duplex communications resulting in improved system efficiency, improved throughput, reduced system latency, and more efficiency utilization of communication resources.

Figure 6:
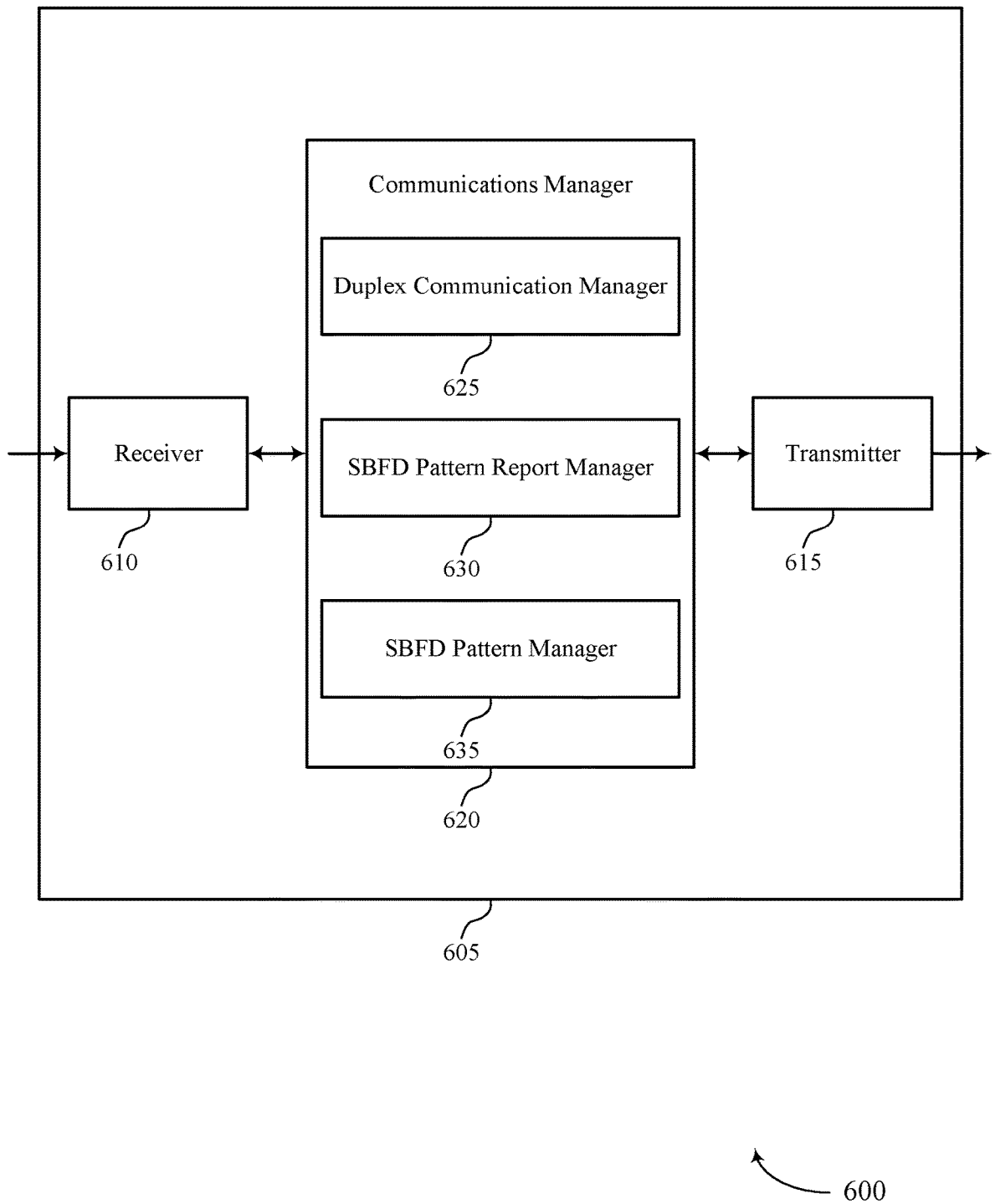

FIG. 6 illustrates a block diagram 600 of a device 605 that supports reporting of preferred subband configurations for full duplex operations in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to reporting of preferred subband configurations for full duplex operations). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to reporting of preferred subband configurations for full duplex operations). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of reporting of preferred subband configurations for full duplex operations as described herein. For example, the communications manager 620 may include a duplex communication manager 625, an SBFD pattern report manager 630, an SBFD pattern manager 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The duplex communication manager 625 may be configured as or otherwise support a means for communicating, by a first wireless node, uplink and downlink signaling with a second wireless node according to a half duplex pattern or a full duplex pattern. The SBFD pattern report manager 630 may be configured as or otherwise support a means for transmitting, to the second wireless node, a SBFD pattern report including an indication of a candidate SBFD pattern including one or more first uplink subbands and one or more first downlink subbands. The SBFD pattern manager 635 may be configured as or otherwise support a means for communicating, based on transmitting the SBFD pattern report, simultaneous uplink and downlink signaling with the second wireless node according to a second SBFD pattern including one or more second uplink subbands and one or more second downlink subbands.

Figure 7:
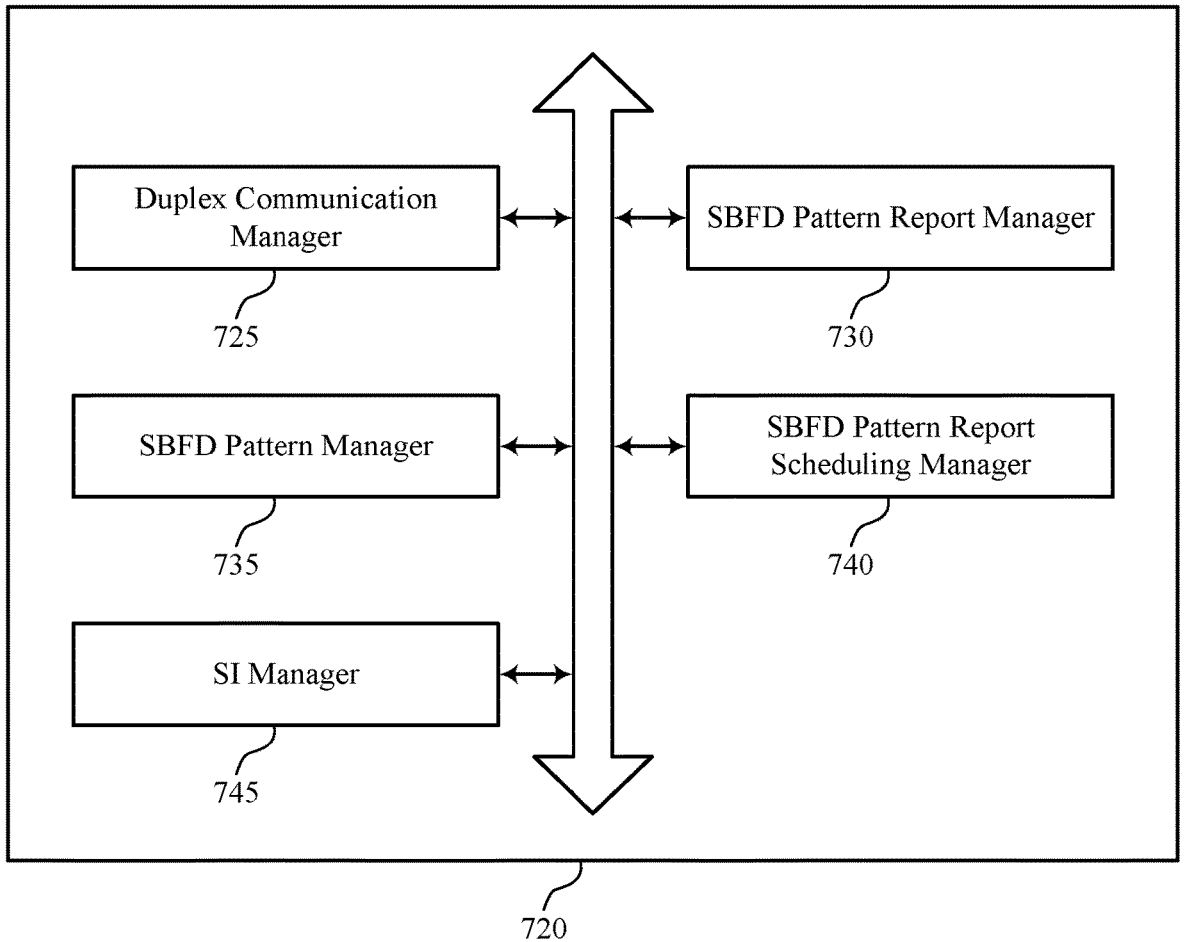
FIG. 7 illustrates a block diagram of a communications manager that supports reporting of preferred subband configurations for full duplex operations in accordance with one or more aspects of the present disclosure.

FIG. 7 illustrates a block diagram 700 of a communications manager 720 that supports reporting of preferred subband configurations for full duplex operations in accordance with one or more aspects of the present disclosure. The communications manager 720 may be an example of aspects of a communications manager 520, a communications manager 620, or both, as described herein. The communications manager 720, or various components thereof, may be an example of means for performing various aspects of reporting of preferred subband configurations for full duplex operations as described herein. For example, the communications manager 720 may include a duplex communication manager 725, an SBFD pattern report manager 730, an SBFD pattern manager 735, an SBFD pattern report scheduling manager 740, an SI manager 745, or any combination thereof. Each of these components may communicate, directly or indirectly, with one another (e.g., via one or more buses).

The communications manager 720 may support wireless communications in accordance with examples as disclosed herein. The duplex communication manager 725 may be configured as or otherwise support a means for communicating, by a first wireless node, uplink and downlink signaling with a second wireless node according to a half duplex pattern or a full duplex pattern. The SBFD pattern report manager 730 may be configured as or otherwise support a means for transmitting, to the second wireless node, a SBFD pattern report including an indication of a candidate SBFD pattern including one or more first uplink subbands and one or more first downlink subbands. The SBFD pattern manager 735 may be configured as or otherwise support a means for communicating, based on transmitting the SBFD pattern report, simultaneous uplink and downlink signaling with the second wireless node according to a second SBFD pattern including one or more second uplink subbands and one or more second downlink subbands.

In some examples, the SBFD pattern report scheduling manager 740 may be configured as or otherwise support a means for receiving, from the second wireless node, a scheduling message indicating resources for transmitting the SBFD pattern report, where transmitting the SBFD pattern report is based on receiving the scheduling message.

In some examples, the SBFD pattern report scheduling manager 740 may be configured as or otherwise support a means for transmitting a scheduling request for obtaining an uplink grant for transmitting the SBFD pattern report, where receiving the scheduling message is based on transmitting the scheduling request.

In some examples, the indicated resources include periodic, semi-persistent, or aperiodic resources on layer 1 or layer.

In some examples, the SI manager 745 may be configured as or otherwise support a means for measuring self-interference at the first wireless node based on signaling communicated according to the half duplex pattern or the full duplex pattern, where transmitting the SBFD pattern report is based on the measured self-interference satisfying a threshold.

In some examples, the SI manager 745 may be configured as or otherwise support a means for receiving, from the second wireless node, an indication of the threshold.

In some examples, the SBFD pattern report manager 730 may be configured as or otherwise support a means for including, in the SBFD pattern report, an indication of one or more candidate uplink subbands, one or more candidate downlink subbands, a candidate quantity of uplink subbands, a candidate quantity of downlink subbands, a candidate quantity of guard bands, a candidate total bandwidth, one or more candidate time locations of SBFD time intervals, a candidate transmit power at the first wireless node, a candidate transmit beam, a candidate receive beam, a threshold transmit power at the first wireless node, a candidate timing value for uplink or downlink transmission, one or more candidate transmission configuration indicator state pairs, a candidate bandwidth part, a candidate component carrier, or any combination thereof.

In some examples, the SBFD pattern report manager 730 may be configured as or otherwise support a means for including, in the SBFD pattern report, an indication of one or more uplink subbands that at least partially overlap in frequency with one or more downlink subbands.

In some examples, the SBFD pattern manager 735 may be configured as or otherwise support a means for performing rate matching, channel state information reporting, spatial filtering, or any combination thereof, according to the second SBFD pattern.

In some examples, the SBFD pattern manager 735 may be configured as or otherwise support a means for receiving, from the second wireless node based on transmitting the SBFD pattern report, a downlink message indicating the second SBFD pattern, where communicating according to the second SBFD pattern is based on receiving the downlink message.

In some examples, the second SBFD pattern is different than the candidate SBFD pattern.

In some examples, the SBFD pattern manager 735 may be configured as or otherwise support a means for receiving, from the second wireless node based on transmitting the SBFD pattern report, an acknowledgement message, where the second SBFD pattern includes the candidate SBFD pattern, and where communicating according to the second SBFD pattern is based on a timer associated with the acknowledgement message expiring.

In some examples, the SBFD pattern manager 735 may be configured as or otherwise support a means for initiating, upon transmitting the SBFD pattern report, a timer, where communicating according to the second SBFD pattern is based on the timer expiring.

In some examples, the SBFD pattern report manager 730 may be configured as or otherwise support a means for including, in the SBFD pattern report, an indication of whether use of the candidate SBFD pattern is optional for the first wireless node or necessary for the first wireless node.

In some examples, the SBFD pattern report manager 730 may be configured as or otherwise support a means for monitoring for an acknowledgement message corresponding to the SBFD report. In some examples, the SBFD pattern report manager 730 may be configured as or otherwise support a means for continuing to communicate uplink and downlink signaling with the second wireless node according to the second SBFD pattern based on a determination that the second wireless node has not transmitted the acknowledgement message, where the second SBFD pattern is the same as the full duplex pattern.

In some examples, the first wireless node includes a user equipment, a repeater, or a mobile terminal functionality of an integrated access backhaul node, a network entity, or any combination thereof, and the second wireless node includes a network entity, a distributed unit functionality of an integrated access backhaul node, a repeater, or any combination thereof.

Figure 8:
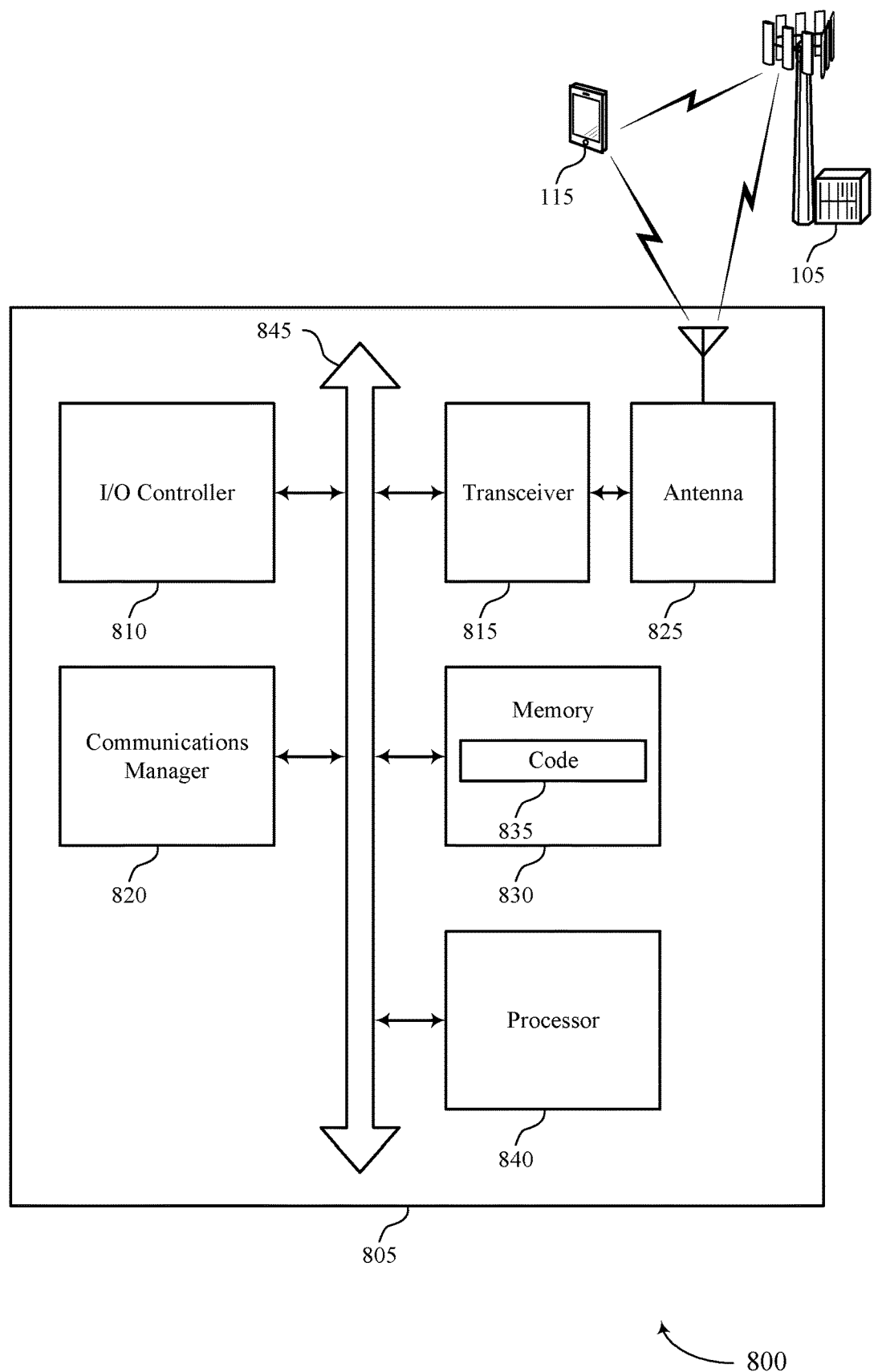
FIG. 8 illustrates a diagram of a system including a device that supports reporting of preferred subband configurations for full duplex operations in accordance with one or more aspects of the present disclosure.

FIG. 8 illustrates a diagram of a system 800 including a device 805 that supports reporting of preferred subband configurations for full duplex operations in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840.

These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting reporting of preferred subband configurations for full duplex operations). For example, the device 805 or a component of the device 805 may include a processor 840 and memory 830 coupled with or to the processor 840, the processor 840 and memory 830 configured to perform various functions described herein.

The communications manager 820 may support wireless communications in accordance with examples as disclosed herein. For example, the communications manager 820 may be configured as or otherwise support a means for communicating, by a first wireless node, uplink and downlink signaling with a second wireless node according to a half duplex pattern or a full duplex pattern. The communications manager 820 may be configured as or otherwise support a means for transmitting, to the second wireless node, a SBFD pattern report including an indication of a candidate SBFD pattern including one or more first uplink subbands and one or more first downlink subbands. The communications manager 820 may be configured as or otherwise support a means for communicating, basing at least in part on transmitting the SBFD pattern report, simultaneous uplink and downlink signaling with the second wireless node according to a second SBFD pattern including one or more second uplink subbands and one or more second downlink subbands.

By including or configuring the communications manager 820 in accordance with examples as described herein, the device 805 may support techniques for full duplex communications resulting in improved connection reliability, decreased interference, increased system efficiency, improved throughput, reduced system latency, and more efficiency utilization of communication resources.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of reporting of preferred subband configurations for full duplex operations as described herein, or the processor 840 and the memory 830 may be otherwise configured to perform or support such operations.

Figure 9:
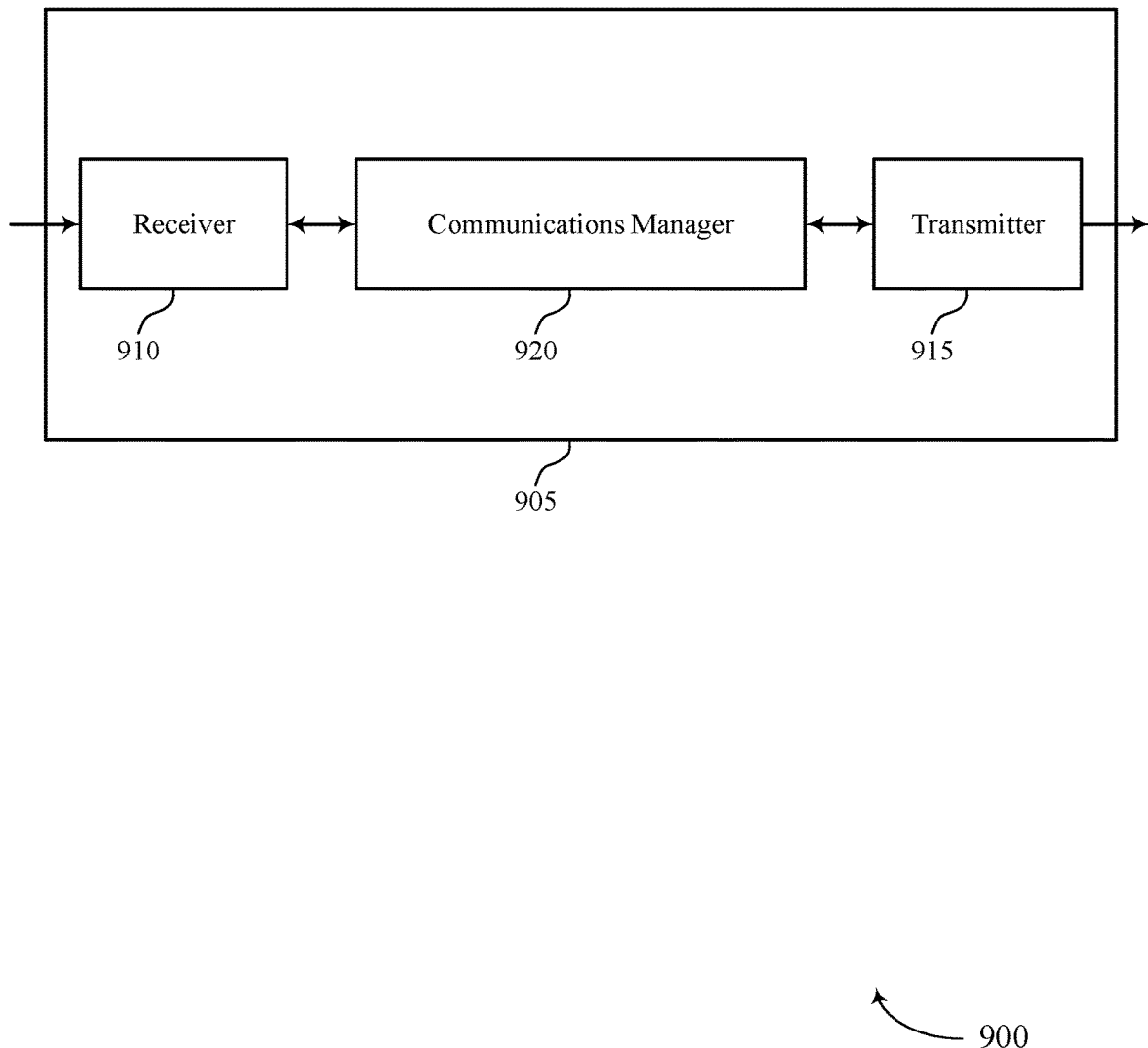
FIGS. 9 and 10 illustrate block diagrams of devices that support reporting of preferred subband configurations for full duplex operations in accordance with one or more aspects of the present disclosure.

FIG. 9 illustrates a block diagram 900 of a device 905 that supports reporting of preferred subband configurations for full duplex operations in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of reporting of preferred subband configurations for full duplex operations as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. For example, the communications manager 920 may be configured as or otherwise support a means for communicating uplink and downlink signaling with a first wireless node by a second wireless node according to a half duplex pattern or a full duplex pattern. The communications manager 920 may be configured as or otherwise support a means for receiving, from the first wireless node, a SBFD pattern report including an indication of a candidate SBFD pattern including one or more first uplink subbands and one or more first downlink subbands. The communications manager 920 may be configured as or otherwise support a means for communicating, basing at least in part on receiving the SBFD pattern report, simultaneous uplink and downlink signaling with the first wireless node according to a second SBFD pattern including one or more second uplink subbands and one or more second downlink subbands.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for full duplex communications resulting in improved system efficiency, improved throughput, reduced system latency, and more efficiency utilization of communication resources.

Figure 10:
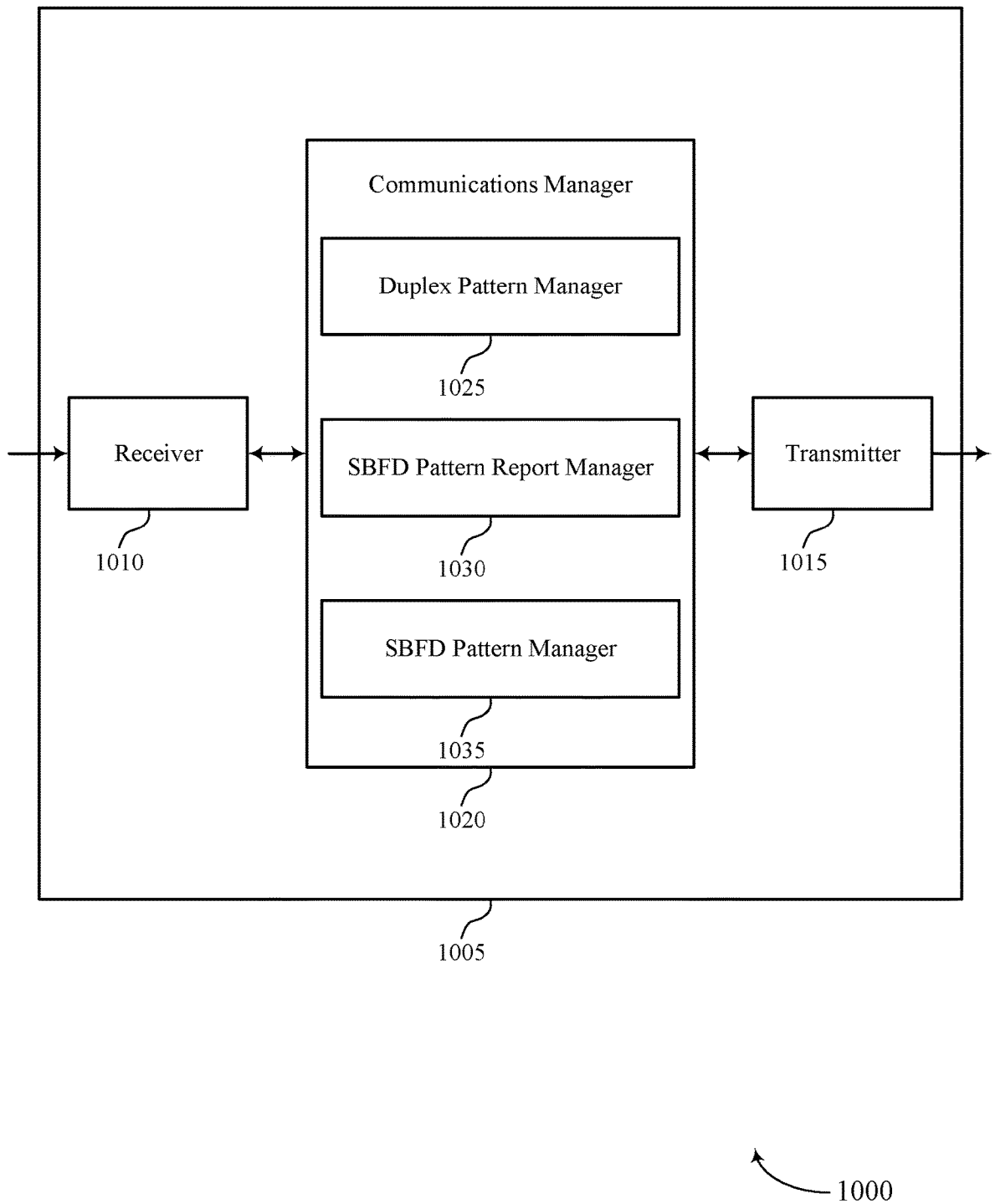

FIG. 10 illustrates a block diagram 1000 of a device 1005 that supports reporting of preferred subband configurations for full duplex operations in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of reporting of preferred subband configurations for full duplex operations as described herein. For example, the communications manager 1020 may include a duplex pattern manager 1025, an SBFD pattern report manager 1030, an SBFD pattern manager 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The duplex pattern manager 1025 may be configured as or otherwise support a means for communicating uplink and downlink signaling with a first wireless node by a second wireless node according to a half duplex pattern or a full duplex pattern. The SBFD pattern report manager 1030 may be configured as or otherwise support a means for receiving, from the first wireless node, a SBFD pattern report including an indication of a candidate SBFD pattern including one or more first uplink subbands and one or more first downlink subbands. The SBFD pattern manager 1035 may be configured as or otherwise support a means for communicating, based on receiving the SBFD pattern report, simultaneous uplink and downlink signaling with the first wireless node according to a second SBFD pattern including one or more second uplink subbands and one or more second downlink subbands.

Figure 11:
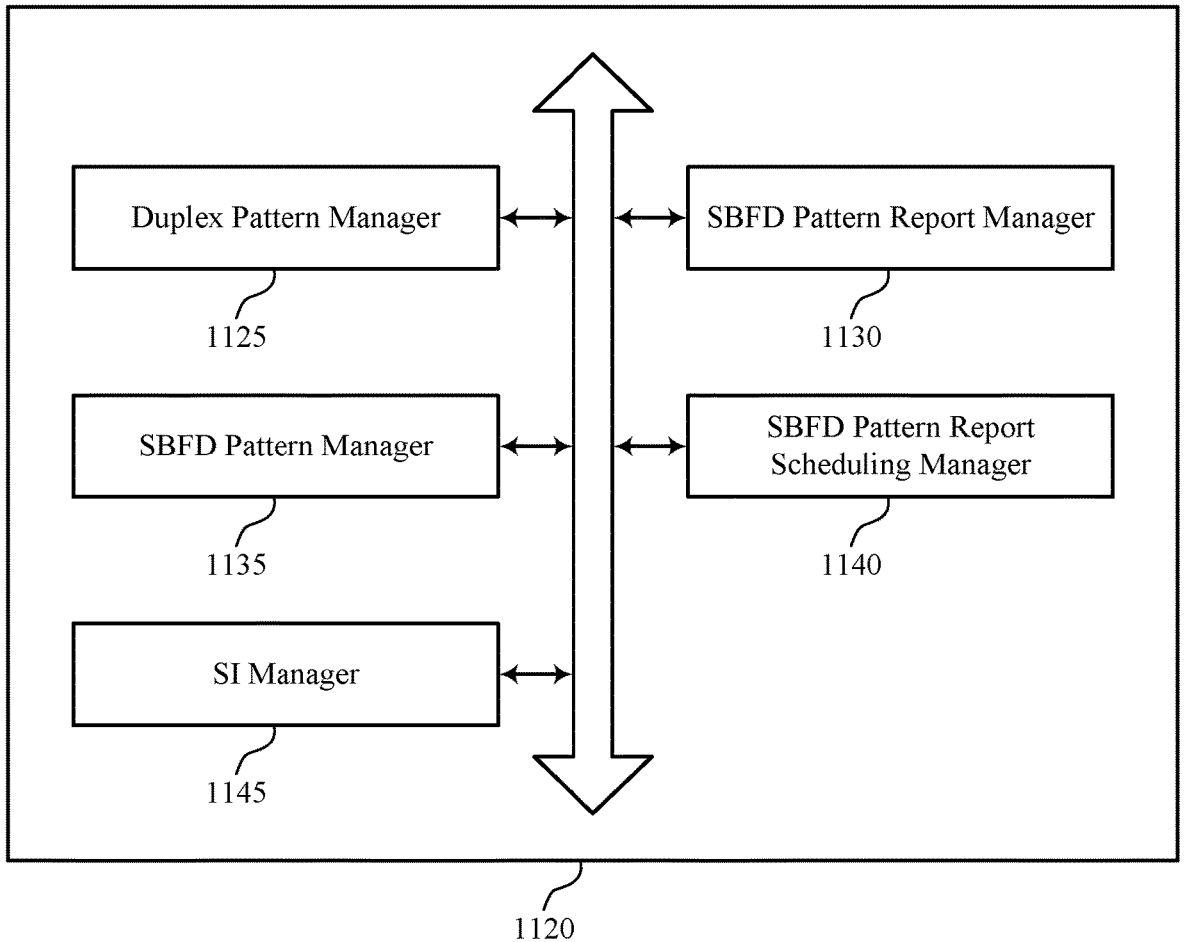
FIG. 11 illustrates a block diagram of a communications manager that supports reporting of preferred subband configurations for full duplex operations in accordance with one or more aspects of the present disclosure.

FIG. 11 illustrates a block diagram 1100 of a communications manager 1120 that supports reporting of preferred subband configurations for full duplex operations in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of reporting of preferred subband configurations for full duplex operations as described herein. For example, the communications manager 1120 may include a duplex pattern manager 1125, an SBFD pattern report manager 1130, an SBFD pattern manager 1135, an SBFD pattern report scheduling manager 1140, an SI manager 1145, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications in accordance with examples as disclosed herein. The duplex pattern manager 1125 may be configured as or otherwise support a means for communicating uplink and downlink signaling with a first wireless node by a second wireless node according to a half duplex pattern or a full duplex pattern. The SBFD pattern report manager 1130 may be configured as or otherwise support a means for receiving, from the first wireless node, a SBFD pattern report including an indication of a candidate SBFD pattern including one or more first uplink subbands and one or more first downlink subbands. The SBFD pattern manager 1135 may be configured as or otherwise support a means for communicating, based on receiving the SBFD pattern report, simultaneous uplink and downlink signaling with the first wireless node according to a second SBFD pattern including one or more second uplink subbands and one or more second downlink subbands.

In some examples, the SBFD pattern report scheduling manager 1140 may be configured as or otherwise support a means for transmitting, to the first wireless node, a scheduling message indicating resources for receiving the SBFD pattern report, where receiving the SBFD pattern report is based on transmitting the scheduling message.

In some examples, the SBFD pattern report scheduling manager 1140 may be configured as or otherwise support a means for receiving a scheduling request for obtaining an uplink grant for transmitting the SBFD pattern report, where transmitting the scheduling message is based on receiving the scheduling request.

In some examples, the indicated resources include periodic, semi-persistent, or aperiodic resources.

In some examples, receiving the SBFD pattern report is based on self-interference at the first wireless node satisfying a threshold.

In some examples, the SI manager 1145 may be configured as or otherwise support a means for transmitting, to the first wireless node, an indication of the threshold.

In some examples, the SBFD pattern report manager 1130 may be configured as or otherwise support a means for receiving, in the SBFD pattern report, an indication of one or more candidate uplink subbands, one or more candidate downlink subbands, a candidate quantity of uplink subbands, a candidate quantity of downlink subbands, a candidate quantity of guard bands, a candidate total bandwidth, one or more candidate time locations of SBFD time intervals, a candidate transmit power at the first wireless node, a candidate transmit beam, a candidate receive beam, a threshold transmit power at the first wireless node, a candidate timing value for uplink or downlink transmission, one or more candidate transmission configuration indicator state pairs, a candidate bandwidth part, a candidate component carrier, or any combination thereof.

In some examples, the SBFD pattern report manager 1130 may be configured as or otherwise support a means for receiving, in the SBFD pattern report, an indication of one or more uplink subbands that at least partially overlap in frequency with one or more downlink subbands.

In some examples, the SBFD pattern manager 1135 may be configured as or otherwise support a means for transmitting, to the first wireless node based on receiving the SBFD pattern report, a downlink message indicating the second SBFD pattern, where communicating according to the second SBFD pattern is based on transmitting the downlink message.

In some examples, the second SBFD pattern is different than the candidate SBFD pattern.

In some examples, the SBFD pattern manager 1135 may be configured as or otherwise support a means for transmitting, to the first wireless node based on receiving the SBFD pattern report, an acknowledgement message, where the second SBFD pattern includes the candidate SBFD pattern, and where communicating according to the second SBFD pattern is based on a timer associated with the acknowledgement message expiring.

In some examples, the SBFD pattern manager 1135 may be configured as or otherwise support a means for initiating, upon receiving the SBFD pattern report, a timer, where communicating according to the second SBFD pattern is based on the timer expiring.

In some examples, the SBFD pattern report manager 1130 may be configured as or otherwise support a means for receiving, in the SBFD pattern report, an indication of whether use of the candidate SBFD pattern is optional for the first wireless node or necessary for the first wireless node.

In some examples, the SBFD pattern manager 1135 may be configured as or otherwise support a means for refraining from transmitting, to the first wireless node based on receiving the SBFD pattern report, an acknowledgement message corresponding to the SBFD report, where the second SBFD pattern is the same as the full duplex pattern.

In some examples, the first wireless node includes a user equipment, a repeater, or a mobile terminal functionality of an integrated access backhaul node, a network entity, or any combination thereof, and the second wireless node includes a network entity, a distributed unit functionality of an integrated access backhaul node, a repeater, or any combination thereof.

Figure 12:
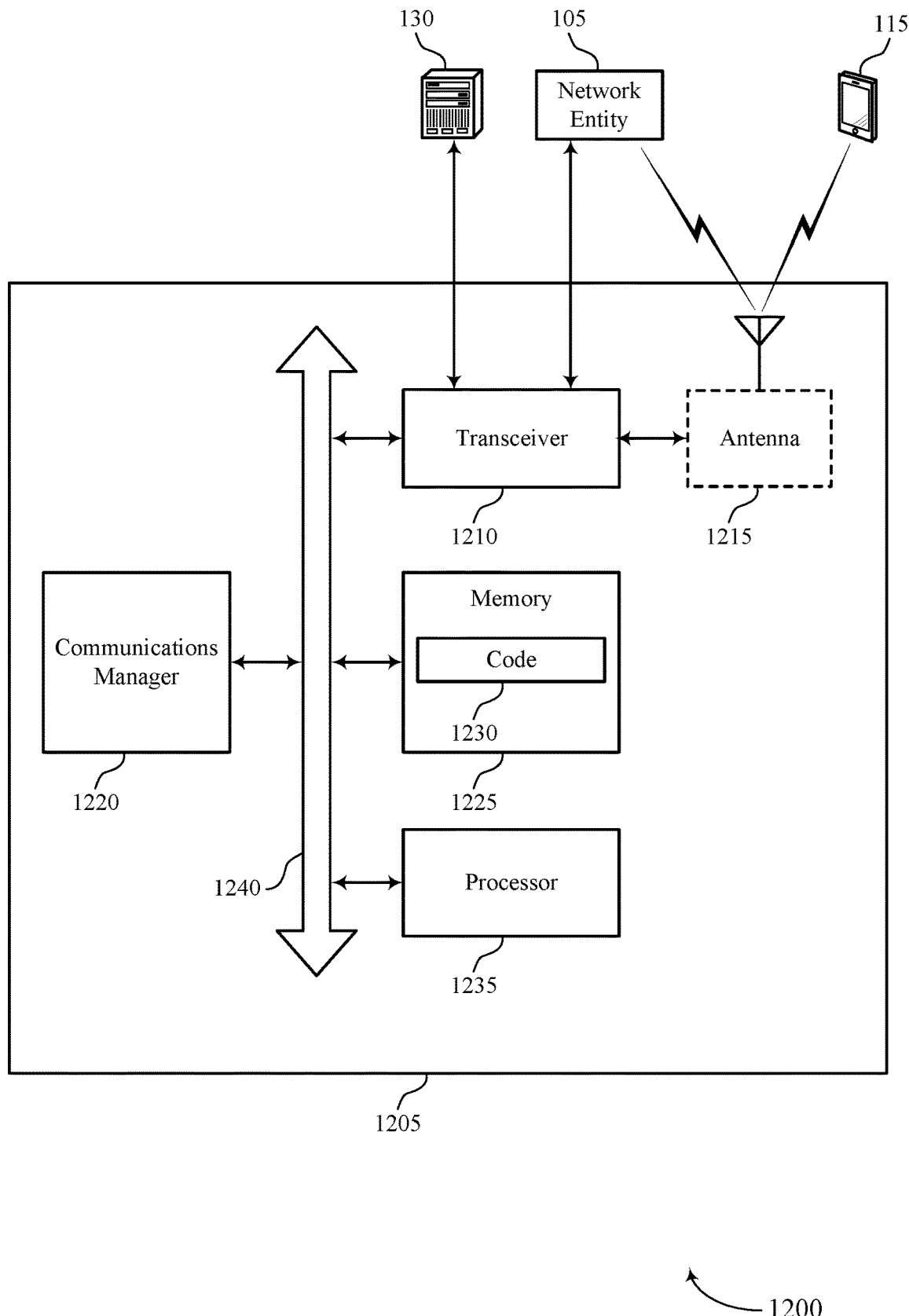
FIG. 12 illustrates a diagram of a system including a device that supports reporting of preferred subband configurations for full duplex operations in accordance with one or more aspects of the present disclosure.

FIG. 12 illustrates a diagram of a system 1200 including a device 1205 that supports reporting of preferred subband configurations for full duplex operations in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting reporting of preferred subband configurations for full duplex operations). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205 and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105 and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications in accordance with examples as disclosed herein. For example, the communications manager 1220 may be configured as or otherwise support a means for communicating uplink and downlink signaling with a first wireless node by a second wireless node according to a half duplex pattern or a full duplex pattern. The communications manager 1220 may be configured as or otherwise support a means for receiving, from the first wireless node, a SBFD pattern report including an indication of a candidate SBFD pattern including one or more first uplink subbands and one or more first downlink subbands. The communications manager 1220 may be configured as or otherwise support a means for communicating, basing at least in part on receiving the SBFD pattern report, simultaneous uplink and downlink signaling with the first wireless node according to a second SBFD pattern including one or more second uplink subbands and one or more second downlink subbands.

By including or configuring the communications manager 1220 in accordance with examples as described herein, the device 1205 may support techniques for full duplex communications resulting in improved connection reliability, decreased interference, increased system efficiency, improved throughput, reduced system latency, and more efficiency utilization of communication resources.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of reporting of preferred subband configurations for full duplex operations as described herein, or the processor 1235 and the memory 1225 may be otherwise configured to perform or support such operations.

Figure 13:
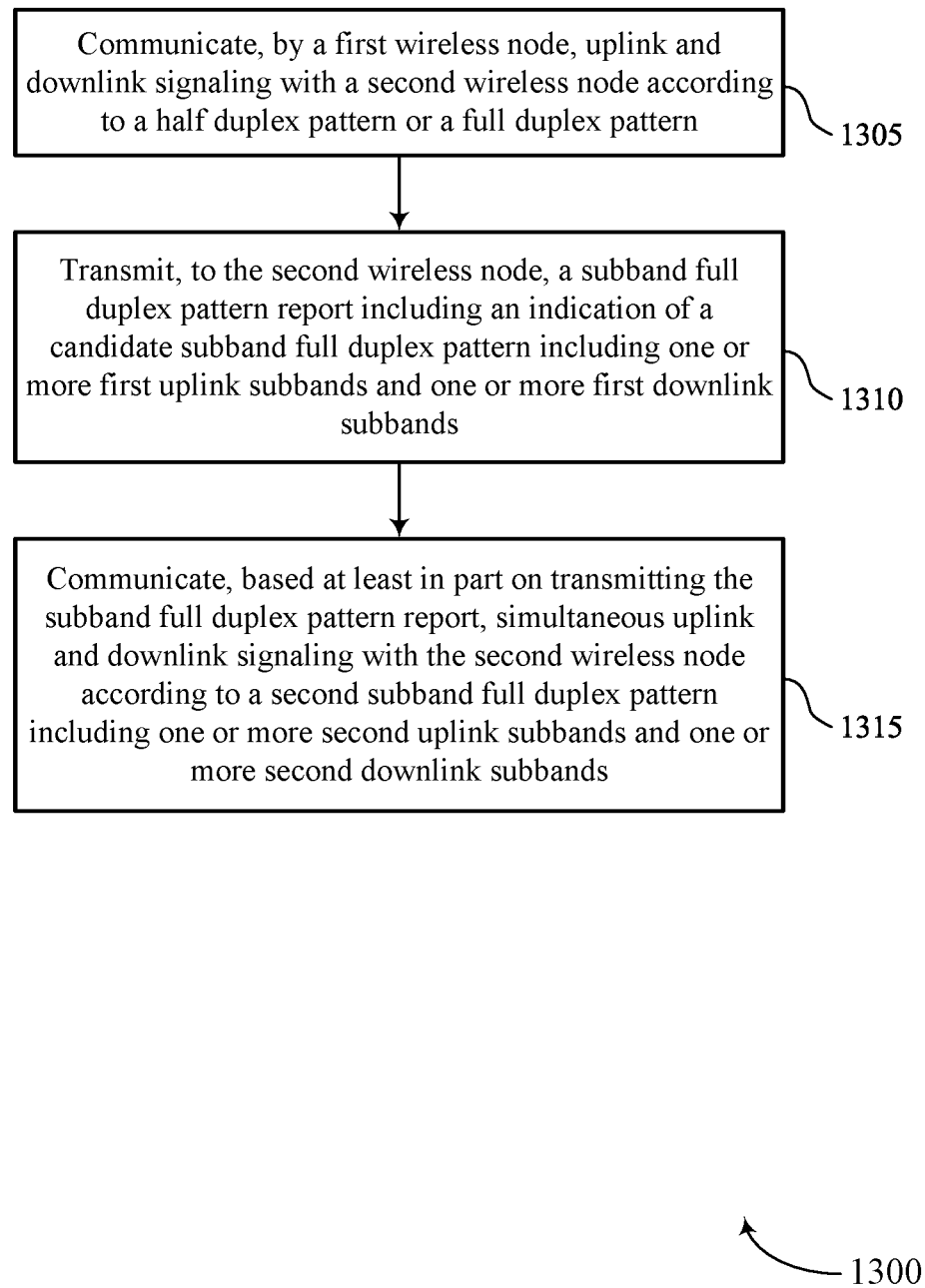
FIGS. 13 through 16 illustrate flowcharts showing methods that support reporting of preferred subband configurations for full duplex operations in accordance with one or more aspects of the present disclosure.

FIG. 13 illustrates a flowchart illustrating a method 1300 that supports reporting of preferred subband configurations for full duplex operations in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include communicating, by a first wireless node, uplink and downlink signaling with a second wireless node according to a half duplex pattern or a full duplex pattern. The operations of 1305 may be performed in accordance with examples as disclosed herein. In some examples, aspects of the operations of 1305 may be performed by a duplex communication manager 725 as described with reference to FIG. 7.

At 1310, the method may include transmitting, to the second wireless node, a SBFD pattern report including an indication of a candidate SBFD pattern including one or more first uplink subbands and one or more first downlink subbands. The operations of 1310 may be performed in accordance with examples as disclosed herein. In some examples, aspects of the operations of 1310 may be performed by an SBFD pattern report manager 730 as described with reference to FIG. 7.

At 1315, the method may include communicating, based on transmitting the SBFD pattern report, simultaneous uplink and downlink signaling with the second wireless node according to a second SBFD pattern including one or more second uplink subbands and one or more second downlink subbands. The operations of 1315 may be performed in accordance with examples as disclosed herein. In some examples, aspects of the operations of 1315 may be performed by an SBFD pattern manager 735 as described with reference to FIG. 7.

Figure 14:
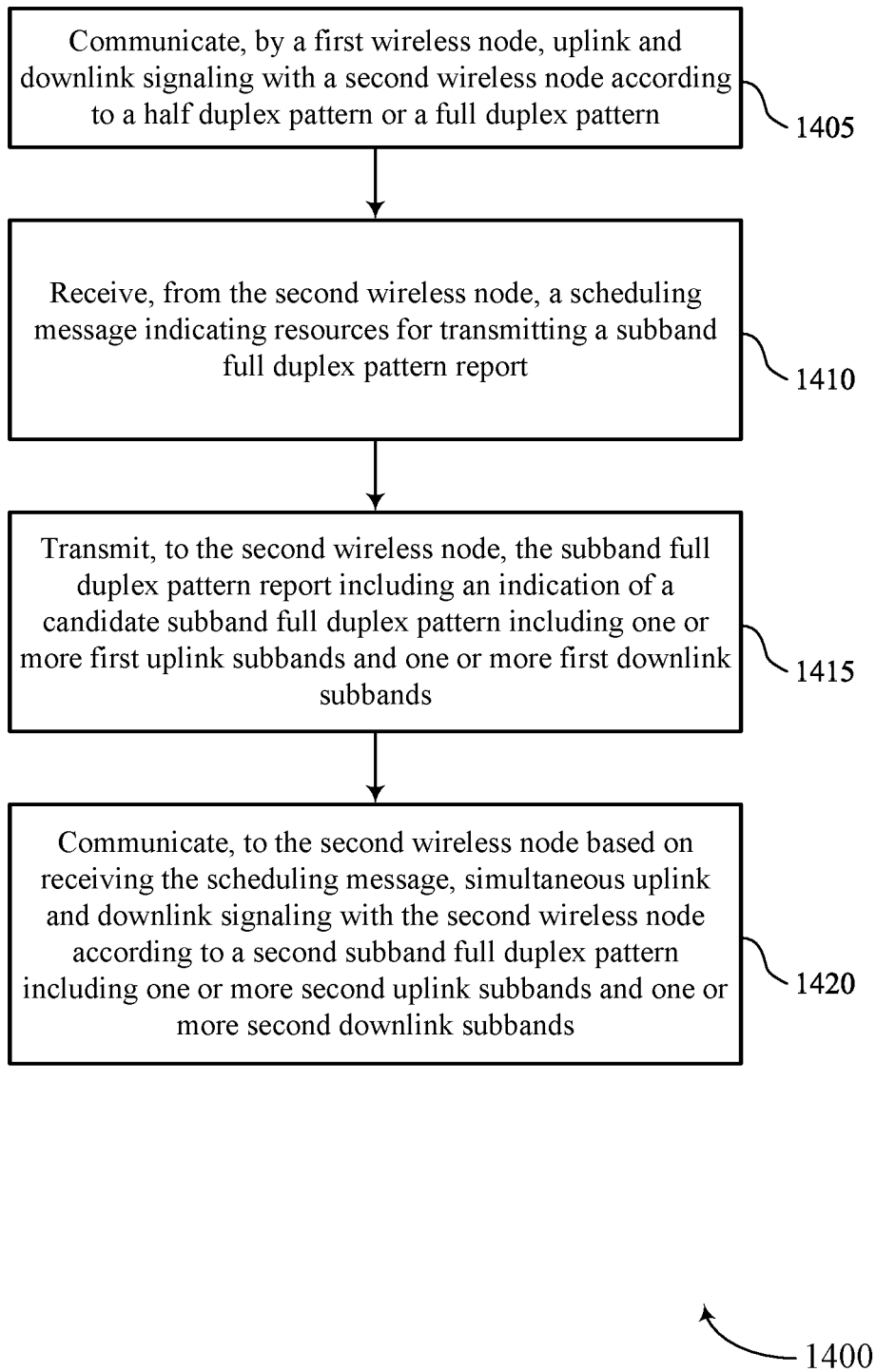

FIG. 14 illustrates a flowchart illustrating a method 1400 that supports reporting of preferred subband configurations for full duplex operations in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include communicating, by a first wireless node, uplink and downlink signaling with a second wireless node according to a half duplex pattern or a full duplex pattern. The operations of 1405 may be performed in accordance with examples as disclosed herein. In some examples, aspects of the operations of 1405 may be performed by a duplex communication manager 725 as described with reference to FIG. 7.

At 1410, the method may include receiving, from the second wireless node, a scheduling message indicating resources for transmitting an SBFD pattern report. The operations of 1410 may be performed in accordance with examples as disclosed herein. In some examples, aspects of the operations of 1410 may be performed by an SBFD pattern report scheduling manager 740 as described with reference to FIG. 7.

At 1415, the method may include transmitting, to the second wireless node based on receiving the scheduling message, the SBFD pattern report including an indication of a candidate SBFD pattern including one or more first uplink subbands and one or more first downlink subbands. The operations of 1415 may be performed in accordance with examples as disclosed herein. In some examples, aspects of the operations of 1415 may be performed by an SBFD pattern report manager 730 as described with reference to FIG. 7.

At 1420, the method may include communicating, based on transmitting the SBFD pattern report, simultaneous uplink and downlink signaling with the second wireless node according to a second SBFD pattern including one or more second uplink subbands and one or more second downlink subbands. The operations of 1420 may be performed in accordance with examples as disclosed herein. In some examples, aspects of the operations of 1420 may be performed by an SBFD pattern manager 735 as described with reference to FIG. 7.

Figure 15:
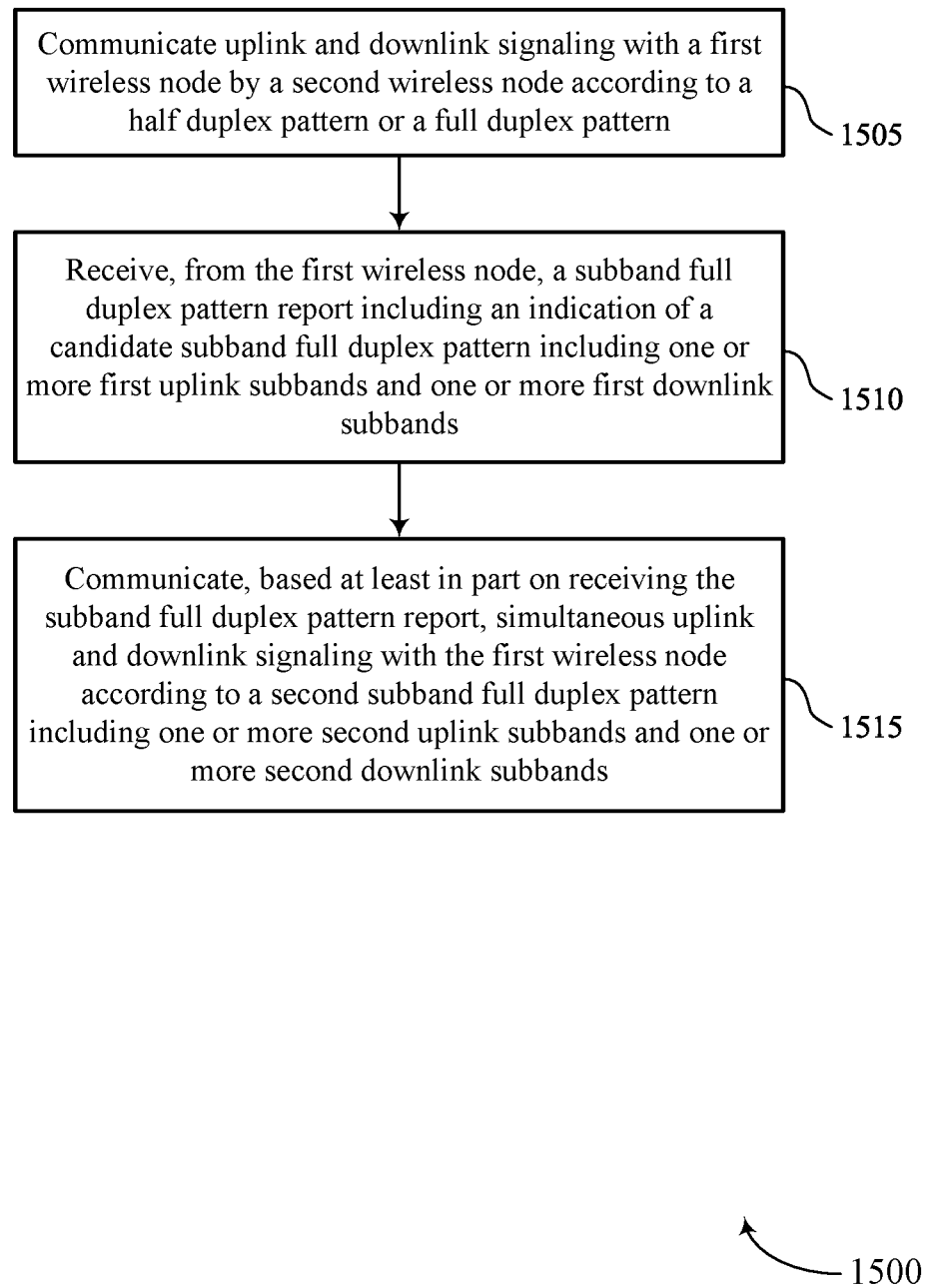

FIG. 15 illustrates a flowchart illustrating a method 1500 that supports reporting of preferred subband configurations for full duplex operations in accordance with one or more aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include communicating uplink and downlink signaling with a first wireless node by a second wireless node according to a half duplex pattern or a full duplex pattern. The operations of 1505 may be performed in accordance with examples as disclosed herein. In some examples, aspects of the operations of 1505 may be performed by a duplex pattern manager 1125 as described with reference to FIG. 11.

At 1510, the method may include receiving, from the first wireless node, a SBFD pattern report including an indication of a candidate SBFD pattern including one or more first uplink subbands and one or more first downlink subbands. The operations of 1510 may be performed in accordance with examples as disclosed herein. In some examples, aspects of the operations of 1510 may be performed by an SBFD pattern report manager 1130 as described with reference to FIG. 11.

At 1515, the method may include communicating, based on receiving the SBFD pattern report, simultaneous uplink and downlink signaling with the first wireless node according to a second SBFD pattern including one or more second uplink subbands and one or more second downlink subbands. The operations of 1515 may be performed in accordance with examples as disclosed herein. In some examples, aspects of the operations of 1515 may be performed by an SBFD pattern manager 1135 as described with reference to FIG. 11.

Figure 16:
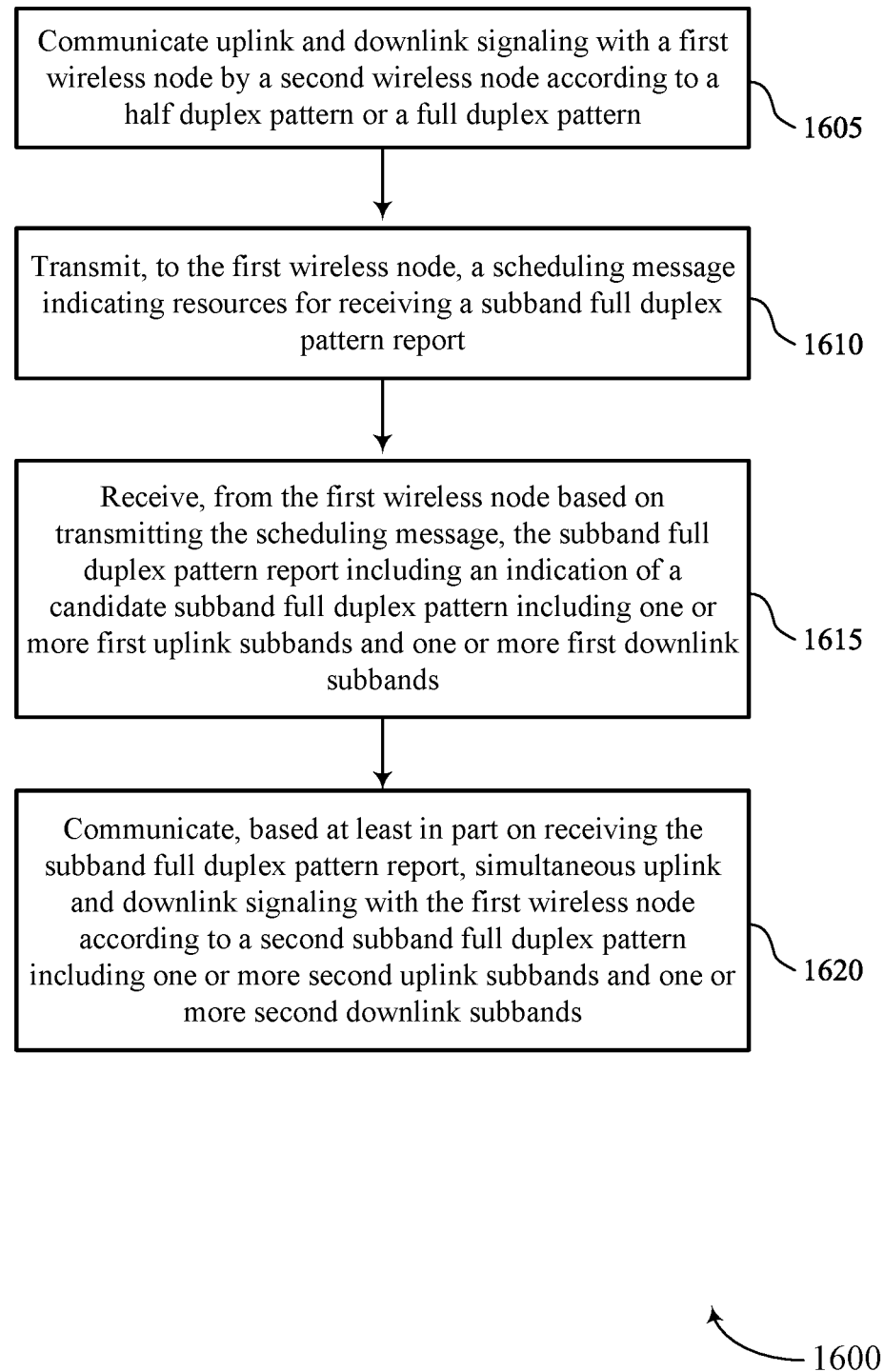

FIG. 16 illustrates a flowchart illustrating a method 1600 that supports reporting of preferred subband configurations for full duplex operations in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include communicating uplink and downlink signaling with a first wireless node by a second wireless node according to a half duplex pattern or a full duplex pattern. The operations of 1605 may be performed in accordance with examples as disclosed herein. In some examples, aspects of the operations of 1605 may be performed by a duplex pattern manager 1125 as described with reference to FIG. 11.

At 1610, the method may include transmitting, to the first wireless node, a scheduling message indicating resources for receiving an SBFD pattern report. The operations of 1610 may be performed in accordance with examples as disclosed herein. In some examples, aspects of the operations of 1610 may be performed by an SBFD pattern report scheduling manager 1140 as described with reference to FIG. 11.

At 1615, the method may include receiving, from the first wireless node based on transmitting the scheduling message, the SBFD pattern report including an indication of a candidate SBFD pattern including one or more first uplink subbands and one or more first downlink subbands. The operations of 1615 may be performed in accordance with examples as disclosed herein. In some examples, aspects of the operations of 1615 may be performed by an SBFD pattern report manager 1130 as described with reference to FIG. 11.

At 1620, the method may include communicating, based on receiving the SBFD pattern report, simultaneous uplink and downlink signaling with the first wireless node according to a second SBFD pattern including one or more second uplink subbands and one or more second downlink subbands. The operations of 1620 may be performed in accordance with examples as disclosed herein. In some examples, aspects of the operations of 1620 may be performed by an SBFD pattern manager 1135 as described with reference to FIG. 11.

The following provides an overview of aspects of the present disclosure:

Aspect 1: A method for wireless communications, comprising: communicating, by a first wireless node, uplink and downlink signaling with a second wireless node according to a half duplex pattern or a full duplex pattern; transmitting, to the second wireless node, a subband full duplex pattern report comprising an indication of a candidate subband full duplex pattern comprising one or more first uplink subbands and one or more first downlink subbands; and communicating, based at least in part on transmitting the subband full duplex pattern report, simultaneous uplink and downlink signaling with the second wireless node according to a second subband full duplex pattern comprising one or more second uplink subbands and one or more second downlink subbands.

Aspect 2: The method of aspect 1, further comprising: receiving, from the second wireless node, a scheduling message indicating resources for transmitting the subband full duplex pattern report, wherein transmitting the subband full duplex pattern report is based at least in part on receiving the scheduling message.

Aspect 3: The method of aspect 2, further comprising: transmitting a scheduling request for obtaining an uplink grant for transmitting the subband full duplex pattern report, wherein receiving the scheduling message is based at least in part on transmitting the scheduling request.

Aspect 4: The method of any of aspects 2 through 3, wherein the indicated resources comprise periodic, semi-persistent, or aperiodic resources on layer 1 or layer.

Aspect 5: The method of any of aspects 1 through 4, further comprising: measuring self-interference at the first wireless node based at least in part on signaling communicated according to the half duplex pattern or the full duplex pattern, wherein transmitting the subband full duplex pattern report is based at least in part on the measured self-interference satisfying a threshold.

Aspect 6: The method of aspect 5, further comprising: receiving, from the second wireless node, an indication of the threshold.

Aspect 7: The method of any of aspects 1 through 6, further comprising: including, in the subband full duplex pattern report, an indication of one or more candidate uplink subbands, one or more candidate downlink subbands, a candidate quantity of uplink subbands, a candidate quantity of downlink subbands, a candidate quantity of guard bands, a candidate total bandwidth, one or more candidate time locations of subband full duplex time intervals, a candidate transmit power at the first wireless node, a candidate transmit beam, a candidate receive beam, a threshold transmit power at the first wireless node, a candidate timing value for uplink or downlink transmission, one or more candidate transmission configuration indicator state pairs, a candidate bandwidth part, a candidate component carrier, or any combination thereof.

Aspect 8: The method of any of aspects 1 through 7, further comprising: including, in the subband full duplex pattern report, an indication of one or more uplink subbands that at least partially overlap in frequency with one or more downlink subbands.

Aspect 9: The method of any of aspects 1 through 8, further comprising: performing rate matching, channel state information reporting, spatial filtering, or any combination thereof, according to the second subband full duplex pattern.

Aspect 10: The method of any of aspects 1 through 9, further comprising: receiving, from the second wireless node based at least in part on transmitting the subband full duplex pattern report, a downlink message indicating the second subband full duplex pattern, wherein communicating according to the second subband full duplex pattern is based at least in part on receiving the downlink message.

Aspect 11: The method of aspect 10, wherein the second subband full duplex pattern is different than the candidate subband full duplex pattern.

Aspect 12: The method of any of aspects 1 through 11, further comprising: receiving, from the second wireless node based at least in part on transmitting the subband full duplex pattern report, an acknowledgement message, wherein the second subband full duplex pattern comprises the candidate subband full duplex pattern, and wherein communicating according to the second subband full duplex pattern is based at least in part on a timer associated with the acknowledgement message expiring.

Aspect 13: The method of any of aspects 1 through 12, further comprising: initiating, upon transmitting the subband full duplex pattern report, a timer, wherein communicating according to the second subband full duplex pattern is based at least in part on the timer expiring.

Aspect 14: The method of any of aspects 1 through 13, further comprising: including, in the subband full duplex pattern report, an indication of whether use of the candidate subband full duplex pattern is optional for the first wireless node or necessary for the first wireless node.

Aspect 15: The method of any of aspects 1 through 14, further comprising: monitoring for an acknowledgement message corresponding to the subband full duplex report; and continuing to communicate uplink and downlink signaling with the second wireless node according to the second subband full duplex pattern based at least in part on a determination that the second wireless node has not transmitted the acknowledgement message, wherein the second subband full duplex pattern is the same as the full duplex pattern.

Aspect 16: The method of any of aspects 1 through 15, wherein the first wireless node comprises a user equipment, a repeater, or a mobile terminal functionality of an integrated access backhaul node, a network entity, or any combination thereof, and the second wireless node comprises a network entity, a distributed unit functionality of an integrated access backhaul node, a repeater, or any combination thereof.

Aspect 17: A method for wireless communications, comprising: communicating uplink and downlink signaling with a first wireless node by a second wireless node according to a half duplex pattern or a full duplex pattern; receiving, from the first wireless node, a subband full duplex pattern report comprising an indication of a candidate subband full duplex pattern comprising one or more first uplink subbands and one or more first downlink subbands; and communicating, based at least in part on receiving the subband full duplex pattern report, simultaneous uplink and downlink signaling with the first wireless node according to a second subband full duplex pattern comprising one or more second uplink subbands and one or more second downlink subbands.

Aspect 18: The method of aspect 17, further comprising: transmitting, to the first wireless node, a scheduling message indicating resources for receiving the subband full duplex pattern report, wherein receiving the subband full duplex pattern report is based at least in part on transmitting the scheduling message.

Aspect 19: The method of aspect 18, further comprising: receiving a scheduling request for obtaining an uplink grant for transmitting the subband full duplex pattern report, wherein transmitting the scheduling message is based at least in part on receiving the scheduling request.

Aspect 20: The method of any of aspects 18 through 19, wherein the indicated resources comprise periodic, semi-persistent, or aperiodic resources.

Aspect 21: The method of any of aspects 17 through 20, wherein receiving the subband full duplex pattern report is based at least in part on self-interference at the first wireless node satisfying a threshold.

Aspect 22: The method of aspect 21, further comprising: transmitting, to the first wireless node, an indication of the threshold.

Aspect 23: The method of any of aspects 17 through 22, further comprising: receiving, in the subband full duplex pattern report, an indication of one or more candidate uplink subbands, one or more candidate downlink subbands, a candidate quantity of uplink subbands, a candidate quantity of downlink subbands, a candidate quantity of guard bands, a candidate total bandwidth, one or more candidate time locations of subband full duplex time intervals, a candidate transmit power at the first wireless node, a candidate transmit beam, a candidate receive beam, a threshold transmit power at the first wireless node, a candidate timing value for uplink or downlink transmission, one or more candidate transmission configuration indicator state pairs, a candidate bandwidth part, a candidate component carrier, or any combination thereof.

Aspect 24: The method of any of aspects 17 through 23, further comprising: receiving, in the subband full duplex pattern report, an indication of one or more uplink subbands that at least partially overlap in frequency with one or more downlink subbands.

Aspect 25: The method of any of aspects 17 through 24, further comprising: transmitting, to the first wireless node based at least in part on receiving the subband full duplex pattern report, a downlink message indicating the second subband full duplex pattern, wherein communicating according to the second subband full duplex pattern is based at least in part on transmitting the downlink message.

Aspect 26: The method of aspect 25, wherein the second subband full duplex pattern is different than the candidate subband full duplex pattern.

Aspect 27: The method of any of aspects 17 through 26, further comprising: transmitting, to the first wireless node based at least in part on receiving the subband full duplex pattern report, an acknowledgement message, wherein the second subband full duplex pattern comprises the candidate subband full duplex pattern, and wherein communicating according to the second subband full duplex pattern is based at least in part on a timer associated with the acknowledgement message expiring.

Aspect 28: The method of any of aspects 17 through 27, further comprising: initiating, upon receiving the subband full duplex pattern report, a timer, wherein communicating according to the second subband full duplex pattern is based at least in part on the timer expiring.

Aspect 29: The method of any of aspects 17 through 28, further comprising: receiving, in the subband full duplex pattern report, an indication of whether use of the candidate subband full duplex pattern is optional for the first wireless node or necessary for the first wireless node.

Aspect 30: The method of any of aspects 17 through 29, further comprising: refraining from transmitting, to the first wireless node based at least in part on receiving the subband full duplex pattern report, an acknowledgement message corresponding to the subband full duplex report, wherein the second subband full duplex pattern is the same as the full duplex pattern.

Aspect 31: The method of any of aspects 17 through 30, wherein the first wireless node comprises a user equipment, a repeater, or a mobile terminal functionality of an integrated access backhaul node, a network entity, or any combination thereof, and the second wireless node comprises a network entity, a distributed unit functionality of an integrated access backhaul node, a repeater, or any combination thereof.

Aspect 32: An apparatus for wireless communications, comprising a processor; memory coupled with the processor; and instructions stored in the memory and executable by the processor to cause the apparatus to perform a method of any of aspects 1 through 16.

Aspect 33: An apparatus for wireless communications, comprising at least one means for performing a method of any of aspects 1 through 16.

Aspect 34: A non-transitory computer-readable medium storing code for wireless communications, the code comprising instructions executable by a processor to perform a method of any of aspects 1 through 16.

Aspect 35: An apparatus for wireless communications, comprising a processor; memory coupled with the processor; and instructions stored in the memory and executable by the processor to cause the apparatus to perform a method of any of aspects 17 through 31.

Aspect 36: An apparatus for wireless communications, comprising at least one means for performing a method of any of aspects 17 through 31.

Aspect 37: A non-transitory computer-readable medium storing code for wireless communications, the code comprising instructions executable by a processor to perform a method of any of aspects 17 through 31.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications, comprising:
   one or more processors;
   memory coupled with the one or more processors; and instructions stored in the memory and executable by the one or more processors to cause the apparatus to:

communicate, by a first wireless node, uplink and downlink signaling with a second wireless node according to a half duplex pattern or a full duplex pattern;

transmit, to the second wireless node, a subband full duplex pattern report comprising an indication of a candidate subband full duplex pattern comprising one or more first uplink subbands and one or more first downlink subbands; and communicate, based at least in part on transmitting the subband full duplex pattern report, simultaneous uplink and downlink signaling with the second wireless node according to a second subband full duplex pattern comprising one or more second uplink subbands and one or more second downlink subbands.

2. The apparatus of claim 1, wherein the instructions are further executable by the one or more processors to cause the apparatus to:

receive, from the second wireless node, a scheduling message indicating resources for transmitting the subband full duplex pattern report, wherein transmitting the subband full duplex pattern report is based at least in part on receiving the scheduling message.

3. The apparatus of claim 2, wherein the instructions are further executable by the one or more processors to cause the apparatus to:

transmit a scheduling request for obtaining an uplink grant for transmitting the subband full duplex pattern report, wherein receiving the scheduling message is based at least in part on transmitting the scheduling request.

4. The apparatus of claim 2, wherein:

the indicated resources comprise periodic, semi-persistent, or aperiodic resources on layer 1 or layer.

5. The apparatus of claim 1, wherein the instructions are further executable by the one or more processors to cause the apparatus to:

measure self-interference at the first wireless node based at least in part on signaling communicated according to the half duplex pattern or the full duplex pattern, wherein transmitting the subband full duplex pattern report is based at least in part on the measured self-interference satisfying a threshold.

6. The apparatus of claim 5, wherein the instructions are further executable by the one or more processors to cause the apparatus to:

receive, from the second wireless node, an indication of the threshold.

7. The apparatus of claim 1, wherein the instructions are further executable by the one or more processors to cause the apparatus to:

include, in the subband full duplex pattern report, an indication of one or more candidate uplink subbands, one or more candidate downlink subbands, a candidate quantity of uplink subbands, a candidate quantity of downlink subbands, a candidate quantity of guard bands, a candidate total bandwidth, one or more candidate time locations of subband full duplex time intervals, a candidate transmit power at the first wireless node, a candidate transmit beam, a candidate receive beam,, a threshold transmit power at the first wireless node, a candidate timing value for uplink or downlink transmission, one or more candidate transmission configuration indicator state pairs, a candidate bandwidth part, a candidate component carrier, or any combination thereof.

8. The apparatus of claim 1, wherein the instructions are further executable by the one or more processors to cause the apparatus to:

include, in the subband full duplex pattern report, an indication of one or more uplink subbands that at least partially overlap in frequency with one or more downlink subbands.

9. The apparatus of claim 1, wherein the instructions are further executable by the one or more processors to cause the apparatus to:

perform rate matching, channel state information reporting, spatial filtering, or any combination thereof, according to the second subband full duplex pattern.

10. The apparatus of claim 1, wherein the instructions are further executable by the one or more processors to cause the apparatus to:

receive, from the second wireless node based at least in part on transmitting the subband full duplex pattern report, a downlink message indicating the second subband full duplex pattern, wherein communicating according to the second subband full duplex pattern is based at least in part on receiving the downlink message.

11. The apparatus of claim 10, wherein:

the second subband full duplex pattern is different than the candidate subband full duplex pattern.

12. The apparatus of claim 1, wherein the instructions are further executable by the one or more processors to cause the apparatus to:

receive, from the second wireless node based at least in part on transmitting the subband full duplex pattern report, an acknowledgement message, wherein the second subband full duplex pattern comprises the candidate subband full duplex pattern, and wherein communicating according to the second subband full duplex pattern is based at least in part on a timer associated with the acknowledgement message expiring.

13. The apparatus of claim 1, wherein the instructions are further executable by the one or more processors to cause the apparatus to:

initiate, in accordance with transmitting the subband full duplex pattern report, a timer, wherein communicating according to the second subband full duplex pattern is based at least in part on the timer expiring.

14. The apparatus of claim 1, wherein the instructions are further executable by the one or more processors to cause the apparatus to:

include, in the subband full duplex pattern report, an indication of whether use of the candidate subband full duplex pattern is optional for the first wireless node or necessary for the first wireless node.

15. The apparatus of claim 1, wherein the instructions are further executable by the one or more processors to cause the apparatus to:

monitor for an acknowledgement message corresponding to the subband full duplex pattern report; and continue to communicate uplink and downlink signaling with the second wireless node according to the second subband full duplex pattern based at least in part on a determination that the second wireless node has not transmitted the acknowledgement message, wherein the second subband full duplex pattern is the same as the full duplex pattern.

16. The apparatus of claim 1, wherein the first wireless node comprises a user equipment, a repeater, or a mobile terminal functionality of an integrated access backhaul node, a network entity, or any combination thereof, and the second wireless node comprises a network entity, a distributed unit functionality of an integrated access backhaul node, a repeater, or any combination thereof.

17. An apparatus for wireless communications, comprising:
one or more processors;
memory coupled with the one or more processors; and
instructions stored in the memory and executable by the one or more processors to cause the apparatus to:
communicate uplink and downlink signaling with a first wireless node by a second wireless node according to a half duplex pattern or a full duplex pattern;
receive, from the first wireless node, a subband full duplex pattern report comprising an indication of a candidate subband full duplex pattern comprising one or more first uplink subbands and one or more first downlink subbands; and
communicate, based at least in part on receiving the subband full duplex pattern report, simultaneous uplink and downlink signaling with the first wireless node according to a second subband full duplex pattern comprising one or more second uplink subbands and one or more second downlink subbands.

18. The apparatus of claim 17, wherein the instructions are further executable by the one or more processors to cause the apparatus to:
transmit, to the first wireless node, a scheduling message indicating resources for receiving the subband full duplex pattern report, wherein receiving the subband full duplex pattern report is based at least in part on transmitting the scheduling message.

19. The apparatus of claim 18, wherein the instructions are further executable by the one or more processors to cause the apparatus to:
receive a scheduling request for obtaining an uplink grant for transmitting the subband full duplex pattern report, wherein transmitting the scheduling message is based at least in part on receiving the scheduling request.

20. The apparatus of claim 17, wherein the instructions are executable by the one or more processors to cause the apparatus to receive the subband full duplex pattern report based at least in part on self-interference at the first wireless node satisfying a threshold.

21. The apparatus of claim 17, wherein the instructions are further executable by the one or more processors to cause the apparatus to:
receive, in the subband full duplex pattern report, an indication of one or more candidate uplink subbands, one or more candidate downlink subbands, a candidate quantity of uplink subbands, a candidate quantity of downlink subbands, a candidate quantity of guard bands, a candidate total bandwidth, one or more candidate time locations of subband full duplex time intervals, a candidate transmit power at the first wireless node, a candidate transmit beam, a candidate receive beam,, a threshold transmit power at the first wireless node, a candidate timing value for uplink or downlink transmission, one or more candidate transmission configuration indicator state pairs, a candidate bandwidth part, a candidate component carrier, or any combination thereof.

22. The apparatus of claim 17, wherein the instructions are further executable by the one or more processors to cause the apparatus to:
receive, in the subband full duplex pattern report, an indication of one or more uplink subbands that at least partially overlap in frequency with one or more downlink subbands.

23. The apparatus of claim 17, wherein the instructions are further executable by the one or more processors to cause the apparatus to:
transmit, to the first wireless node based at least in part on receiving the subband full duplex pattern report, a downlink message indicating the second subband full duplex pattern, wherein communicating according to the second subband full duplex pattern is based at least in part on transmitting the downlink message.

24. The apparatus of claim 17, wherein the instructions are further executable by the one or more processors to cause the apparatus to:
transmit, to the first wireless node based at least in part on receiving the subband full duplex pattern report, an acknowledgement message, wherein the second subband full duplex pattern comprises the candidate subband full duplex pattern, and wherein communicating according to the second subband full duplex pattern is based at least in part on a timer associated with the acknowledgement message expiring.

25. The apparatus of claim 17, wherein the instructions are further executable by the one or more processors to cause the apparatus to:
initiate, in accordance with receiving the subband full duplex pattern report, a timer, wherein communicating according to the second subband full duplex pattern is based at least in part on the timer expiring.

26. The apparatus of claim 17, wherein the instructions are further executable by the one or more processors to cause the apparatus to:
receive, in the subband full duplex pattern report, an indication of whether use of the candidate subband full duplex pattern is optional for the first wireless node or necessary for the first wireless node.

27. The apparatus of claim 17, wherein the instructions are further executable by the one or more processors to cause the apparatus to:
refrain from transmitting, to the first wireless node based at least in part on receiving the subband full duplex pattern report, an acknowledgement message corresponding to the subband full duplex pattern report, wherein the second subband full duplex pattern is the same as the full duplex pattern.

28. The apparatus of claim 17, wherein the first wireless node comprises a user equipment, a repeater, or a mobile terminal functionality of an integrated access backhaul node, a network entity, or any combination thereof, and the second wireless node comprises a network entity, a distributed unit functionality of an integrated access backhaul node, a repeater, or any combination thereof.

29. A method for wireless communications, comprising:
communicating, by a first wireless node, uplink and downlink signaling with a second wireless node according to a half duplex pattern or a full duplex pattern;
transmitting, to the second wireless node, a subband full duplex pattern report comprising an indication of a candidate subband full duplex pattern comprising one or more first uplink subbands and one or more first downlink subbands; and communicating, based at least in part on transmitting the subband full duplex pattern report, simultaneous uplink and downlink signaling with the second wireless node according to a second subband full duplex pattern comprising one or more second uplink subbands and one or more second downlink subbands.

30. A method for wireless communications, comprising:

communicating uplink and downlink signaling with a first wireless node by a second wireless node according to a half duplex pattern or a full duplex pattern;

receiving, from the first wireless node, a subband full duplex pattern report comprising an indication of a candidate subband full duplex pattern comprising one or more first uplink subbands and one or more first downlink subbands; and communicating, based at least in part on receiving the subband full duplex pattern report, simultaneous uplink and downlink signaling with the first wireless node according to a second subband full duplex pattern comprising one or more second uplink subbands and one or more second downlink subbands.

* * * * *